(12) United States Patent
Shramkova et al.

(10) Patent No.: US 12,174,512 B2
(45) Date of Patent: Dec. 24, 2024

(54) DEVICE FOR FORMING AN OUTGOING ELECTROMAGNETIC WAVE FROM AN INCIDENT ELECTROMAGNETIC WAVE

(71) Applicant: InterDigital CE Patent Holdings, Paris (FR)

(72) Inventors: Oksana Shramkova, Liffré (FR); Artem Boriskin, Thorigné-Fouillard (FR); Valter Drazic, Betton (FR)

(73) Assignee: InterDigital CE Patent Holdings, Paris (FR)

( * ) Notice: Subject to any disclaimer, the term of this patent is extended or adjusted under 35 U.S.C. 154(b) by 688 days.

(21) Appl. No.: 17/415,491

(22) PCT Filed: Dec. 17, 2019

(86) PCT No.: PCT/EP2019/085489
§ 371 (c)(1),
(2) Date: Jun. 17, 2021

(87) PCT Pub. No.: WO2020/127150
PCT Pub. Date: Jun. 25, 2020

(65) Prior Publication Data
US 2022/0050352 A1   Feb. 17, 2022

(30) Foreign Application Priority Data
Dec. 18, 2018  (EP) ..................... 18213596

(51) Int. Cl.
G02F 1/29      (2006.01)
(52) U.S. Cl.
CPC ..................... G02F 1/29 (2013.01)
(58) Field of Classification Search
CPC ....................................... G02F 1/29
(Continued)

(56) References Cited

U.S. PATENT DOCUMENTS 3,718,383 A   2/1973 Moore
6,099,146 A   8/2000 Imamura
(Continued)

FOREIGN PATENT DOCUMENTS

CN   1319191 A   10/2001
CN   1502050 A   6/2004
(Continued)

OTHER PUBLICATIONS

Gennarelli, G. et al., "A uniform asymptotic solution for the diffraction by a right-angled dielectric wedge" IEEE transactions on antennas and propagation, vol. 59 No. 3, Mar. 2011 pp. 898-903 (6 pages).

(Continued)

*Primary Examiner* — Wyatt A Stoffa
*Assistant Examiner* — Grant A Gagnon
(74) *Attorney, Agent, or Firm* — Klintworth & Rozenblat IP LLP

(57) ABSTRACT

An optical device forming an outgoing electromagnetic wave from an incident electromagnetic wave is disclosed. Such a device comprises at least one unit cell comprising:— at least two optical elements, an optical element being characterized by a type of optical response to said incident electromagnetic wave;—selection means enabling selective excitation of at least one optical element among the at least two optical elements, in response to said incident electromagnetic wave as a function of a wavelength of said incident electromagnetic wave, wherein said selection means comprise at one nanojet-based dielectric deflector compound of at least two dielectric material having different refractive indexes, and wherein said optical elements are placed at a distance from said nanojet-based dielectric deflector.

17 Claims, 11 Drawing Sheets

(58) Field of Classification Search
USPC .......................................................... 359/298
See application file for complete search history.

(56) References Cited

U.S. PATENT DOCUMENTS

| | | |
|---|---|---|
| 6,721,485 B1 | 4/2004 | Nakamura |
| 6,891,147 B2 | 5/2005 | Goto |
| 7,142,363 B2 | 11/2006 | Sato |
| 7,394,535 B1 | 7/2008 | Chen |
| 7,738,346 B2 | 6/2010 | Ooi |
| 8,885,997 B2 | 11/2014 | Nguyen |
| 9,099,370 B2 | 8/2015 | Nishiwaki |
| 9,140,602 B2 | 9/2015 | Narasimhan |
| 9,297,939 B2 | 3/2016 | Palanchoke |
| 9,383,582 B2 | 7/2016 | Tang |
| 9,419,036 B2 | 8/2016 | Saitou |
| 9,564,469 B2 | 2/2017 | Kim |
| 9,766,467 B2 | 9/2017 | Sohn |
| 9,827,209 B2 | 11/2017 | Kostamo |
| 9,880,393 B2 | 1/2018 | Kim |
| 9,891,436 B2 | 2/2018 | Wall |
| 10,534,115 B1 | 1/2020 | Calafiore |
| 10,866,360 B2 | 12/2020 | Khorasaninejad |
| 11,163,175 B2 | 11/2021 | Boriskin |
| 11,204,452 B2 | 12/2021 | Paniagua Dominguez |
| 11,275,252 B2 | 3/2022 | Boriskin |
| 11,396,474 B2 | 7/2022 | Drazic |
| 11,573,356 B2 | 2/2023 | Shramkova |
| 11,604,363 B2 | 3/2023 | Damghanian |
| 2004/0198582 A1 | 10/2004 | Borrelli |
| 2005/0002611 A1 | 1/2005 | Levola |
| 2006/0124833 A1 | 6/2006 | Toda |
| 2006/0250933 A1 | 11/2006 | Asada |
| 2009/0190094 A1 | 7/2009 | Watanabe |
| 2009/0205090 A1 | 8/2009 | Mimouni |
| 2010/0091376 A1 | 4/2010 | Sano |
| 2010/0134890 A1 | 6/2010 | Chen |
| 2010/0188537 A1 | 7/2010 | Hiramoto |
| 2011/0043918 A1 | 2/2011 | Crouse |
| 2011/0235166 A1 | 9/2011 | Zhu |
| 2012/0147373 A1 | 6/2012 | Kamimura |
| 2013/0099343 A1 | 4/2013 | Toshikiyo |
| 2013/0099434 A1 | 4/2013 | Yano |
| 2013/0250421 A1 | 9/2013 | Wakabayashi |
| 2013/0322810 A1 | 12/2013 | Robbins |
| 2014/0192409 A1 | 7/2014 | Yamaguchi |
| 2015/0063753 A1 | 3/2015 | Evans |
| 2015/0219842 A1 | 8/2015 | Sqalli |
| 2015/0286060 A1 | 10/2015 | Roh |
| 2015/0301333 A1 | 10/2015 | Levesque |
| 2015/0323800 A1 | 11/2015 | Nam |
| 2015/0362641 A1 | 12/2015 | Boyraz |
| 2015/0362841 A1 | 12/2015 | Zelsacher |
| 2016/0033697 A1 | 2/2016 | Sainiemi |
| 2016/0054172 A1 | 2/2016 | Roh |
| 2016/0064172 A1 | 3/2016 | Kirbawy |
| 2016/0064448 A1 | 3/2016 | Shin |
| 2016/0070062 A1 | 3/2016 | Lipson |
| 2016/0172390 A1 | 6/2016 | Numata |
| 2016/0231568 A1 | 8/2016 | Saarikko |
| 2016/0274281 A1 | 9/2016 | Lutolf |
| 2017/0006278 A1 | 1/2017 | Vandame |
| 2017/0012078 A1 | 1/2017 | Han |
| 2017/0090206 A1 | 3/2017 | Kim |
| 2017/0092668 A1 | 3/2017 | Kim |
| 2017/0092676 A1 | 3/2017 | Yun |
| 2017/0097510 A1 | 4/2017 | Sohn |
| 2017/0098672 A1 | 4/2017 | Yun |
| 2017/0179178 A1 | 6/2017 | Park |
| 2017/0201658 A1 | 7/2017 | Rosenblatt |
| 2017/0212348 A1 | 7/2017 | Fu |
| 2017/0307886 A1 | 10/2017 | Stenberg |
| 2017/0315346 A1 | 11/2017 | Tervo |
| 2017/0351111 A1 | 12/2017 | Jeong |
| 2018/0113313 A1 | 4/2018 | Tekolste |
| 2018/0231771 A1 | 8/2018 | Schuck, III |
| 2018/0252850 A1 | 9/2018 | Aoki |
| 2018/0259691 A1 | 9/2018 | Wang |
| 2018/0354844 A1 | 12/2018 | Drazic |
| 2019/0101700 A1 | 4/2019 | Boriskin |
| 2019/0121239 A1 | 4/2019 | Singh |
| 2019/0243233 A1 | 8/2019 | Boriskin |
| 2019/0257986 A1 | 8/2019 | Paniagua Dominguez |
| 2020/0066811 A1 | 2/2020 | Cha |
| 2020/0233223 A1 | 7/2020 | Shramkova |
| 2020/0348526 A1 | 11/2020 | Boriskin |
| 2021/0041609 A1 | 2/2021 | Shramkova |
| 2021/0041709 A1 | 2/2021 | Damghanian |
| 2021/0088802 A1 | 3/2021 | Murakami |
| 2021/0233291 A1 | 7/2021 | Shramkova |
| 2022/0059250 A1 | 2/2022 | Shramkova |

FOREIGN PATENT DOCUMENTS

| | | |
|---|---|---|
| CN | 1606704 A | 4/2005 |
| CN | 1661478 A | 8/2005 |
| CN | 1693928 A | 11/2005 |
| CN | 1756972 A | 4/2006 |
| CN | 1762009 A | 4/2006 |
| CN | 1898584 A | 1/2007 |
| CN | 101114031 A | 1/2008 |
| CN | 101114032 A | 1/2008 |
| CN | 101241202 A | 8/2008 |
| CN | 101263378 A | 9/2008 |
| CN | 101359094 A | 2/2009 |
| CN | 101467021 A | 6/2009 |
| CN | 101611333 A | 12/2009 |
| CN | 101688929 A | 3/2010 |
| CN | 102498374 A | 6/2012 |
| CN | 101799589 B | 5/2013 |
| CN | 103119498 A | 5/2013 |
| CN | 104718479 A | 6/2015 |
| CN | 105074511 A | 11/2015 |
| CN | 105765421 A | 7/2016 |
| CN | 106331445 A | 1/2017 |
| CN | 106772734 A | 5/2017 |
| CN | 106932845 A | 7/2017 |
| CN | 107462983 A | 12/2017 |
| CN | 108508506 A | 9/2018 |
| CN | 108885354 A | 11/2018 |
| CN | 108919399 A | 11/2018 |
| CN | 109073885 A | 12/2018 |
| CN | 109891318 A | 6/2019 |
| EP | 1406098 A1 | 4/2004 |
| EP | 1542043 A1 | 6/2005 |
| EP | 1904827 A2 | 4/2008 |
| EP | 2196729 | 6/2010 |
| EP | 2229938 | 9/2010 |
| EP | 2955753 | 12/2015 |
| EP | 3223062 A1 | 9/2017 |
| EP | 3223063 A1 | 9/2017 |
| EP | 3240046 A1 | 11/2017 |
| EP | 3312646 A1 | 4/2018 |
| EP | 3312660 A1 | 4/2018 |
| EP | 3312674 A1 | 4/2018 |
| EP | 3339938 A1 | 6/2018 |
| EP | 3385219 A1 | 10/2018 |
| EP | 3499278 | 6/2019 |
| EP | 3540479 A1 | 9/2019 |
| EP | 3540499 | 9/2019 |
| EP | 3540499 A1 | 9/2019 |
| EP | 3588150 | 1/2020 |
| EP | 3591700 A1 | 1/2020 |
| EP | 3671293 | 6/2020 |
| EP | 3671322 A1 | 6/2020 |
| GB | 2529003 | 2/2016 |
| JP | 2003005129 A | 1/2003 |
| JP | 2014134564 | 7/2014 |
| JP | 2016500160 A | 1/2016 |
| JP | 2017063198 A | 3/2017 |
| TW | 200502570 A | 1/2005 |
| TW | 201042286 A | 12/2010 |
| WO | 03007032 A1 | 1/2003 |
| WO | 2003025635 A1 | 3/2003 |

(56) References Cited

FOREIGN PATENT DOCUMENTS

| | | |
|---|---|---|
| WO | 2004094326 A3 | 5/2005 |
| WO | 2007031991 A2 | 3/2007 |
| WO | 2009083977 A2 | 7/2009 |
| WO | 2014036537 A1 | 3/2014 |
| WO | 2014044912 | 3/2014 |
| WO | 2017116637 | 7/2017 |
| WO | 2017116637 A1 | 7/2017 |
| WO | 2017131983 | 8/2017 |
| WO | 2017162880 A1 | 9/2017 |
| WO | 2017162882 A1 | 9/2017 |
| WO | 2017180403 | 10/2017 |
| WO | 2017180403 A1 | 10/2017 |
| WO | 2018052750 A1 | 3/2018 |
| WO | 2018102582 | 6/2018 |
| WO | 2018102582 A1 | 6/2018 |
| WO | 2018102834 A2 | 6/2018 |
| WO | 2019175062 A1 | 9/2019 |
| WO | 2020128030 A1 | 6/2020 |
| WO | 2021053182 | 3/2021 |

OTHER PUBLICATIONS

Wang, P. et al., "Ultra-high-sensitivity color imaging via a transparent diffractive-filter array and computational optics: supplementary material." Optica, Oct. 2015 (9 pages).
Fontaine, R. "The state-of-the-art of mainstream CMOS image sensors." In Proceedings of the International Image Sensors Workshop, 2015 (4 pages).
Wang, P. et al., "Computational single-shot hyper-spectral imaging based on a microstructured diffractive optic." In 2016 Conference on Lasers and Electro-Optics (CLEO), IEEE, 2016 (2 pages).
Palanchoke, U. et al., "Spectral sorting of visible light using dielectric gratings." Optics Express 25, No. 26, Dec. 2017 pp. 33389-33399 (11 pages).
Rakovich, Y. P. et al., "Photonic Nanojets in Coupled Microcavities." In The European Conference on Lasers and Electro-Optics, p. JSV2_3. Optical Society of America, 2009 (1 page).
Yang, J. et al., "Polychromatic see-through near-eye display design with two waveguides and a large field-of-view." In Optics, Photonics and Digital Technologies for Imaging Applications IV, vol. 9896, p. 989605. International Society for Optics and Photonics, 2016 (7 pages).
International Preliminary Report on Patentability for PCT/EP2019/084526 issued on Jun. 16, 2021, 11 pages.
Liu, Cheng-Yang, "Photonic Jets Produced by Dielectric Micro Cuboids". Applied Optics, vol. 54, Issue 29, (2015), pp. 8694-8699.
Varghese, B. et al., "Influence of an edge height on the diffracted EM field distribution." In 2019 21st International Conference on Transparent Optical Networks (ICTON), pp. 1-4. IEEE, 2019.
Shramkova, O. et al "Photonic nanojet generated by dielectric multi-material microstructure" META Jul. 2019, (2 pages).
Neves, A. A. R., "Photonic nanojets in optical tweezers." Journal of Quantitative Spectroscopy and Radiative Transfer 162, Mar. 17, 2015 (20 pages).
Eisen, L., et al., "Total internal reflection diffraction grating in conical mounting." Optics communications 261, No. 1, 2006, pp. 13-18 (6 pages).
Levola, T., "Diffractive optics for virtual reality displays." Journal of the Society for Information Display 14, No. 5, 2006 pp. 467-475 (9 pages).
Zhang, Li, et al., "CE4-related: History-based Motion Vector Prediction", Joint Video Experts Team (JVET) of ITU-T SG 16 WP 3 and ISO/IEC JTC 1/SC 29/WG 11, Document: JVET-K0104-v5, 11th Meeting: Ljubljana, SI, Jul. 10-18, 2018 (7 pages).
Tao, Z. et al., "Design of polarization-dependent color filters based on all-dielectric metasurfaces for dynamic modulation of color HSV", 11th International Congress on Engineered Materials Platforms for Novel Wave Phenomena (Metamaterials), 2017, 3 pages.
Lotti, F. et al., "Nanoparticle-based metasurfaces for angular-independent spectral filtering applications", 2017 Conference on Lasers and Electro-Optics Europe & European Quantum Electronics Conference (CLEO/Europe—EQEC), 2017.
Mahani, F. F., et al., "Optimization of plasmonic color filters for CMOS image sensors by genetic algorithm", 2nd Conference on Swarm Intelligence and Evolutionary Computation (CSIEC), 2017, 4 pages.
Gordon, James P., "Radiation Forces and Momenta in Dielectric Media", Phys. Rev. A vol. 8, 14—Published Jul. 1, 1973, 8 pages. Available online at: http://totuvach.free.fr/Articles/gordon73.pdf.
Wang, Hoatian, et. al., "Trapping and manipulating nanoparticles in photonic nanojets", Optics Letters vol. 41 No. 7, Apr. 2016, 4 pages.
Cui, Xudong, et al., "Optical forces on metallic nanoparticles induced by a photonic nanojet", Optics Express, vol. 16, Issue 18, Oct. 2008, pp. 13560-13568 (9 pages).
Zheng, Zhu, et al., "Optical trapping with focused Airy beams", Applied Optics vol. 50, Issue 1, 2011, pp. 43-49 (7 pages).
Siviloglou, Georgios A., et. al., "Accelerating finite energy Airy beams", Apr. 15, 2007, vol. 32, No. 8, Optics Letters, pp. 979-981 (3 pages).
Čižmár, Thomas, et. al., "Optical conveyor belt for delivery of submicron objects" Applied Physics Letters, vol. 86, Issue 17, Apr. 25, 2005, 3 pages.
V. Garcés-Chávez, et. al., "Simultaneous micromanipulation in multiple planes using a self-reconstructing light beam", Nature vol. 419, Sep. 12, 2002, 145-147 (3 pages).
Bosanac, Lana, et. al., "Efficient Optical Trapping and Visualization of Silver Nanoparticles", Nano Letters 2008, vol. 8, No. 5, pp. 1486-1491 (6 pages).
Ashkin, A., et. al., "Observation of a single-beam gradient force optical trap for dielectric particles", Optics Letters vol. 11, Issue 5, May 1986 pp. 288-290 (3 pages).
Ahskin, A., et. al., "Optical trapping and manipulation of viruses and bacteria", Science, Mar. 1987, vol. 235, Issue 4795, pp. 1517-1520 (4 pages).
Block, Steven M., et al., "Bead movement by single kinesin molecules studied with optical tweezers", Nature, vol. 348, Nov. 1990 pp. 348-352 (5 pages).
Jones, P. H., et. al., "Trapping and manipulation of microscopic bubbles with a scanning optical tweezer", Applied Physics Letters, vol. 89, Issue 8, Aug. 21, 2006 (3 pages).
X. Tsampoula, et. al., "Femtosecond cellular transfection using a nondiffracting light beam", Applied Physics Letters, vol. 91, Issue 5, Jul. 30, 2007 (3 pages).
Siviloglou, Georgios A., et. al., "Observation of Accelerating Airy Beams", Physics Review Letters, vol. 99, Issue 21—Published Nov. 20, 2007 (4 pages).
Berry, M. V., et. al., "Nonspreading wave packets", American Journal of Physics, vol. 47, Iss. 3, Mar. 1979 (4 pages).
Yannopapas, Vassilios, "Photonic nanojets as three-dimensional optical atom traps: A theoretical study", Optics Communications, vol. 285, Issue 12, pp. 2952-2955, Jun. 1, 2012, 3 pages.
Zhang, Peng, et. al., "Trapping and guiding microparticles with morphing autofocusing Airy beams", Optics Letters, vol. 36, No. 15, Aug. 2011, pp. 2883-2885 (3 pages).
Liu, Yujie, et al., "Total internal reflection diffraction grating in conical mounting and its application in planar display", International Conference on Photonics and Optical Engineering (icPOE 2014), vol. 9449, pp. 9449-9449-6, 2015 (6 pages).
Zhanjun, Yan, et al., "Virtual display design using waveguide hologram in conical mounting configuration." Optical Engineering, Sep. 2011, 50:50-50-9 (8 pages).
J. R. DeVore, "Refractive Indices of Rutile and Sphalerite," J. Opt. Soc. Am. 41, pp. 416-419, 1951 (4 pages).
International Preliminary Report on Patentability for PCT/EP2019/063802 issued on Dec. 29, 2020, 8 pages.
Genevet, Patrice, et. al., "Recent Advances In Planar Optics: From Plasmonic to Dielectric Metasurfaces". Optica, vol. 4, No. 1, Jan. 2017, pp. 139-152.
Aieta, Francesco, et. al., "Multiwavelength Achromatic Metasurfaces by Dispersive Phase Compensation". Sciencexpress, 2015, (8 pages).
Khorasaninejad, Mohammadreza, et. al., "Achromatic Metasurface Lens at Telecommunication Wavelengths". Nano Letters, 2015, (5 pages).

(56) References Cited

OTHER PUBLICATIONS

Deng, Zi-Lan, et. al., "Wide-Angle and High-Efficiency Achromatic Metasurfaces for Visible Light". Optical Express, vol. 24, No. 20 pp. 23118-23128 (12 pages). Mar. 2016.
Avayu, Ori, et. al., "Composite Functional Metasurfaces for Multispectral Achromatic Optics". Nature Communications, 2017, pp. 1-7 (7 pages).
Nishiwaki, Seiji, et. al., "Efficient Colour Splitters for High-Pixel-Density Image Sensors". Nature Photonics, vol. 7, Mar. 2013, pp. 240-246.
International Search Report and Written Opinion of the International Searching Authority for PCT/EP2019/085489, mailed Jan. 30, 2020, 11 pages.
Yi, Jianjia, et. al., "Coherent Beam Control With an All-Dielectric Transformation Optics Based Lens". Scientific Reports, vol. 6, No. 1, Jan. 5, 2016, pp. 1-8.
Zhao, Yanhui, et. al., "Beam Bending via Plasmonic Lenses". Optics Express, vol. 18, No. 22, Oct. 25, 2010, pp. 23458-23465.
Jun, Young Chul, et. al., "Optical Manipulation With Plasmonic Beam Shaping Antenna Structures". Advances in OptoElectronicsm, (2012).
Khorasaninejad, Mohammadreza, et. al., "Super-Dispersive Off-Axis Meta-Lenses for Compact High Resolution Spectroscopy". Nano Letters, vol. 16, No. 6, (2016), pp. 3732-3737.
Liu, Zhaowei, et. al., "Tuning The Focus of a Plasmonic Lens by The Incident Angle". Applied Physics Letters, vol. 88, No. 17, (2006), pp. 171108-1-171108-2.
Chen, Yiguo, et. al., "Engineering The Phase Front of Light With Phase-Change Material Based Planar Lenses". Scientific Reports vol. 5, No. 1, Mar. 2, 2015, pp. 1-7.
Kong, Soon-Cheol, et. al., "Photonic Nanojet-Enabled Optical Data Storage". Optical Society of America, Optics Express, vol. 16, No. 18, Sep. 1, 2008, pp. 13713-13719.
Pacheco-Peña, V., et. al., "Terajets Produced by Dielectric Cuboids". Applied Physics Letters 105, 084102, (2014), doi: 10.1063/1.4894243, 5 pages.
Pacheco-Peña, V., et. al., "Multifrequency Focusing and Wide Angular Scanning of Terajets". Optical Society of America, Optics Letters, vol. 40, No. 2, (2015), 5 pages.
Itagi, A. V., et. al., , "Optics of Photonic Nanojets". Optical Society of America. J. Opt. Soc. Am. A , Vo.22, Dec. 2005 pp. 2847-2858 (12 pages).
Heifetz, Alexander, et. al., "Subdiffraction Optical Resolution of a Gold Nanosphere Located Within The Nanojet of a Mie-Resonant Dielectric Microsphere". Optical Express, vol. 15, No. 25, (2007), 17334-17342.
Devilez, Alexis, et. al., "Three-Dimensional Subwavelength Confinement of Light With Dielectric Microspheres". Optics Express, vol. 17, No. 4, Feb. 16, 2009, pp. 2089-2094.
Shen, Yuecheng, et. al., "Ultralong Photonic Nanojet Formed by a Two-Layer Dielectric Microsphere". Optical Letters, Optical Society of America, vol. 39, No. 14, Jul. 15, 2014, 4120-4123.
Ruiz, César Méndez, et. al., "Detection of Embedded Ultrasubwavelength-Thin Dielectric Features Using Elongated Photonic Nanojets". Optical Express, vol. 18, No. 16, Aug. 2, 2010, pp. 16805-16812.
Geints, Yuri E., et. al., "Photonic Nanojet Calculations In Layered Radially Inhomogeneous Micrometer-Sized Spherical Particles". Optical Society of America, vol. 28, No. 8, Aug. 2011, 1825-1830.
Gu, Guoqiang, et. al. "Super-Long Photonic Nanojet Generated from Liquid-Filled Hollow Microcylinder". Optical Society of America, Optical Letters, vol. 40, No. 4, Feb. 15, 2015, pp. 625-628.
Mao, Xiurun, et. al., "Tunable Photonic Nanojet Formed by Generalized Luneburg Lens". Optics Express, vol. 23, No. 20, (2015), pp. 26426-26433.
Geints, Yu, E., et. al., "Modeling Spatially Localized Photonic Nanojets From Phase Diffraction Gratings". Journal of Applied Physics, vol. 119, No. 15, Apr. 21, 2016, pp. 153101-1-153101-6.
International Search Report and Written Opinion of the International Searching Authority for PCT/EP2019/055679 mailed May 16, 2019, 10 pages.
International Preliminary Report on Patentability for PCT/EP19/055679 issued on Sep. 15, 2020, 6 pages.
Kotlyar, Victor, et. al., "Photonic Nanojets Generated Using Square-Profile Microsteps". Optical Society of America, Applied Optics, vol. 53, No. 24, Aug. 20, 2014, pp. 5322-5329.
International Search Report and Written Opinion of the International Searching Authority for PCT/EP2019/055905 mailed May 22, 2019, 12 pages.
International Preliminary Report on Patentability for PCT/EP2019/055905 issued on Sep. 15, 2020, 8 pages.
Xiao, Jiasheng, et. al., "Design of Achromatic Surface Microstructure for Near-Eye Display With Diffractive Waveguide". Optics Communications, vol. 452, (2019), pp. 411-416.
International Search Report and Written Opinion of the International Searching Authority for PCT/EP2019/063802 mailed Sep. 16, 2019, 14 pages.
Ang, Angeleene S., et. al., "'Photonic Hook' Based Optomechanical Nanoparticle Manipulator". Scientific Reports, vol. 8. No. 2029, Published online: Feb. 1, 2018, pp. 1-7.
Chaumet, P. C., et. al., "Time-Averaged Total Force on a Dipolar Sphere In an Electromagnetic Field". Optics Letters, vol. 25, No. 15, (2000), pp. 1065-1067 (3 pages).
Xu, Chen, et. al., "Photon Nanojet Lens: Design, Fabrication and Characterization". Nanotechnology, vol. 27, No. 16, Mar. 4, 2016, pp. 1-6.
Yue, Liyang, et. al., "Photonic Hook: A New Curved Light Beam". Optics Letters, vol. 43, No. 4, Feb. 2018, pp. 771-774 (5 pages).
International Search Report and Written Opinion of the International Searching Authority PCT/EP2019/084526 mailed Mar. 10, 2020, 15 pages.
Boriskin, Artem, et. al., "Near Field Focusing by Edge Diffraction". Optics Letters, vol. 43, No. 16, Aug. 2018, pp. 4053-4056 (4 pages).
Shramkova, Oksana, et. al., "Localized Photonic Jets Generated by Step-Like Dielectric Microstructures". IEEE 20th International Conference on Transparent Optical Networks (ICTON), (2018), pp. 1-4. (4 pages).
Liu, Cheng-Yang, et. al., "Localized Photonic Nanojets Formed by Core-Shell Diffraction Gratings". Integrated Optics: Physics and Simulations III, International Society for Optics and Photonics, vol. 10242, (2017), p. 102420W (4 pages).
International Search Report and Written Opinion of the International Searching Authority for PCT/EP2019/063739 mailed Aug. 8, 2019, (11 pages).
International Preliminary Report on Patentability for PCT/EP2019/063739 issued on Jan. 5, 2021, (7 pages).
International Search Report and Written Opinion of the International Searching Authority for PCT/EP2019/086776 mailed Mar. 6, 2020, 13 pages.
International Search Report and Written Opinion for PCT/EP2021/057273 mailed Jun. 30, 2021 (15 pages).
International Preliminary Report on Patentability for PCT/EP2019/085489 issued Jun. 16, 2021, (8 pages).
International Preliminary Report on Patentability for PCT/EP2019/086776 issued Jun. 16, 2021, (9 pages).
Teranishi, N. et al., "Evolution of optical structure in image sensors." In 2012 International Electron Devices Meeting, pp. 24-1. IEEE, 2012 (4 pages).
Nishiwaki, S. et al., "Highly Sensitive Image Sensors Using Micro Color Splitters." ITE Technical Report vol. 37 No. 47, Dec. 2014 (2 pages).
Chen, Q. et al., "Nanophotonic image sensors." Small 12, No. 36, 2016: 4922-4935 (14 pages).

DEVICE FOR FORMING AN OUTGOING ELECTROMAGNETIC WAVE FROM AN INCIDENT ELECTROMAGNETIC WAVE

The present application is a national stage application under 35 U.S.C. § 371 of International Application No. PCT/EP2019/085489, entitled "DEVICE FOR FORMING AN OUTGOING ELECTROMAGNETIC WAVE FROM AN INCIDENT ELECTROMAGNETIC WAVE", filed on Dec. 17, 2019, which claims benefit from European Patent Application Serial No. 18213596.2, entitled "DEVICE FOR FORMING AN OUTGOING ELECTROMAGNETIC WAVE FROM AN INCIDENT ELECTROMAGNETIC WAVE", filed Dec. 18, 2018.

1. TECHNICAL FIELD

The present disclosure relates to the field of optics and photonics, and more specifically to planar optical devices, based on ultrathin optical interfaces also referred to as metasurface devices. It may find applications in the field of conformable and wearable optics (i.e. AR/VR glasses (Augmented Reality/Virtual Reality)), as well as in a variety of other electronic consumer products comprising displays and/or lightweight imaging systems.

2. BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

AR/VR glasses are considered as the next generation human-machine interface, thus raising significant interest of major industrial players in the domain of consumer electronics and mobile devices.

Development of AR/VR glasses (and more generally eyewear electronic devices) is associated with a number of challenges, including reduction of size and weight of such devices as well as improvement of the image quality (in terms of contrast, field of view, color depth, etc.) that should be realistic enough to enable a truly immersive user experience.

The tradeoff between the image quality and physical size of the optical components motivates research into ultra-compact (preferably subwavelength-size) optical components that can be used as building blocks for more complex optical systems, such as AR/VR glasses.

Conventional volumetric optical components, such as refractive and diffractive microlenses and free-form optical combiners, are bulky and thus do not fully satisfy the needs of eyewear devices.

Alternative solutions, based on different physical principles, are necessary to provide desired performances.

A lingering problem of refractive and diffractive optics is the strong chromatic aberrations that originate from the dispersion of the phase accumulated by light during propagation. The chromatic aberrations limit the usefulness of optical systems for multiwavelength or broadband applications. The dependence of the focal distance on the wavelength is responsible for the degradation of the quality of an imaging system. Overcoming chromatic aberrations is required in various imaging systems ranging from conventional microscopy and photography to sophisticated astronomical spectroscopy and optical coherence tomography. The elimination of chromatic aberrations at two and three wavelengths is accomplished using, respectively, two and three elements (achromatic doublet and apochromatic triplet) arranged to achieve the same focal length at the wavelengths of interest. However, these multilens approaches are bulky and require complex designs and multiple materials.

To overcome limitations intrinsic to conventional optical components, a new family of ultra-thin optical devices has recently been proposed, based on optical interfaces comprising plurality of subwavelength-scale optical resonators. This family of devices is also referred as 'flat optics' and 'metasurface' devices.

A metasurface may be defined as an optically thin (i.e. much thinner than the wavelength of an incident electromagnetic wave) array of sub-wavelength size, sub-wavelength spaced optical elements, formed of individual microparticles usually made of metal (e.g. gold) or high-index dielectric material (e.g. silicon), which may act as resonators, optical antennas . . . . Metasurfaces can be either structured or not structured with subwavelength-scaled patterns in the horizontal dimensions.

Metasurfaces may also be defined as a periodic array of scattering elements whose dimensions and periods are small compared with the operating wavelength.

Due to their negligible thickness compared to the wavelength of operation, metasurfaces can (near resonances of unit cell constituents) be considered as an interface of discontinuity enforcing an abrupt change in both the amplitude and phase of the impinging light. One of the most important applications of metasurfaces is hence to control the wavefront of electromagnetic waves by imparting local, gradient phase shift to the incoming waves. They can actually provide an abrupt change of the phase, amplitude, and/or polarization of the incident electromagnetic wave (e.g. visible light).

Moreover, the optical responses of metasurface devices can be tailored by tuning the shape and size of individual microparticles and/or spacing between them.

Being assembled on or inside a dielectric plate, such optical resonators can provide a collective response required for many optical devices of general interest, such as focusing, beam deflection, and polarization conversion. A few examples of metasurface devices can be found in "*Recent advances in planar optics: from plasmonic to dielectric metasurfaces*", by P. Genevet, F. Capasso et al., *Optica* 4(1), 139-152, 2017, and are disclosed in FIG. 1.

Although having a very attractive form-factor (ultra-thin and flat shape), all reported metasurface devices operating in the optical range have some important limitations, including a wavelength dependence of the metalens profile. Due to chromatic aberrations, by changing the wavelength, the focal line moves. For on-axis focusing, due to the symmetric nature of its phase profile, the focal line shifts only along the focusing axis. For an off-axis lens, changing the wavelength results in an additional lateral shift of the focal line.

Optical metasurfaces, composed of an array of nanoresonators having a fraction of a wavelength in thickness, can overcome these limitations by imparting strong phase changes that can be relatively constant over a broad spectral wavelength range. It has been found in "*Multiwavelength achromatic metasurfaces by dispersive phase compensation*," by F. Aieta, M. Kats, P. Genevet, F. Capasso, *Science* 347, 1342-1345, 2015 and as illustrated in FIG. 2 that initial designs of achromatic metasurfaces have shown that 240-

μm-long silicon rectangular dielectric resonators can deflect normally incident light of various wavelengths in the same direction. FIG. 2 illustrates a side view (a) of a metasurface made of 240 unit cells, each consisting of a slot of the same width s, comprising two coupled rectangular dielectric resonators of fixed height t and varying width $w_1$ and $w_2$. Such a metasurface is designed to diffract normally incident plane waves at three wavelengths by the same angle. FIG. 2(b) shows a simulated far field intensity as a function of the angle θ from the normal to the interface for such a MS with a zoom in around the angle θ=−17° and FIG. 2(c) shows the Far-field transmission measurement with the insets showing the experimental setup and SEM image of a portion of the metasurface (s=1 μm).

The achromatic lens at the wavelengths of 1300, 1550, and 1800 nm was presented in "*Achromatic metasurface lens at telecommunication wavelengths,*" by M. Khorasaninejad, et al., *Nano Lett.* 15, 5358-5362, 2015. This lens consists of an aperiodic arrangement of coupled rectangular dielectric resonators whose scattering phases are engineered to achieve dispersion-free focusing.

A metasurface with a wide incidence-angle range of 10° to 80° and high efficiency was proposed in "*Wide-angle and high-efficiency achromatic metasurfaces for visible light,*" by Z.-L. Deng et al., *Opt. Expr.* 24, 23118-23128, 2016. This metasurface is constructed by multiple metallic nano-groove gratings, which support enhanced diffractions due to the excitations of localized gap plasmon modes at different resonance wavelengths. The device achieves achromaticity without unwanted diffractions. When the light at a specific wavelength illuminates the metasurface, only the gap-plasmon mode in the nanogrooves that resonate at this wavelength is excited. As the resonance frequencies of the different nanogroove gratings are separated and not coupled together, the other nanogrooves do not respond to this wavelength.

Although a great progress in the field of single-layer metasurfaces has been made, some problems remain. Because a single-layer metasurface offers only limited interaction between light and scatterers (i.e., the resonators), the major energy cannot be controlled, and the efficiency is lower than that required for practical applications. At the same time, light typically exchanges energy with each meta-molecule, and, if the material of the meta-molecules incurs non-ignorable losses, a large amount of energy is transformed into heating the material, which represents high losses.

A dense vertical stacking of independent metasurfaces was proposed in "*Composite functional metasurfaces for multispectral achromatic optics,*" by O. Avayu, E. Almeida, Ye. Prior, T. Ellenbogen *Nature Comm.* 8, 14992, 2017 (DOI: 10.1038/ncomms14992) and illustrated in FIG. 3. FIG. 3 illustrates a three-layer lens, FIG. 3(a) is an example view of the three-layer lens. When illuminated with white light, each layer focuses its designated part of the spectrum to a distance of 1 mm along the optical axis. FIG. 3(b) shows a schematic illustration of the layered structure. In such a stacked multilayered metasurface, each layer is fabricated from different materials and with different design parameters to optimize it for a specific frequency band, and possibly, for a predefined functionality. The layers consist of metallic disc-shaped nanoparticles that support localized surface plasmon resonances in the visible part of the spectrum. The dependence of the localized surface plasmon resonances on the parameters of the nanodiscs and on their material, provides control over the spectral response of the layers so that each layer operates independently and with minimal spectral crosstalk with the others. Using this approach, authors demonstrate a triply red, green and blue achromatic metalens in the visible range.

It would hence be desirable to provide an optical device, relying on the use of metasurfaces, which would be an improvement over the prior art. It would also be desirable to provide such an optical device, which would be capable of correcting/alleviating the chromatic aberrations for red, green and blue (RGB) colors in the visible spectrum.

3. SUMMARY

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

According to an embodiment of the present disclosure, an optical device forming an outgoing electromagnetic wave from an incident electromagnetic wave, wherein it comprises at least one unit cell is disclosed. Said unit cell comprises:

- at least two optical elements, an optical element being characterized by a type of optical response to said incident electromagnetic wave;
- selection means enabling selective excitation of at least one optical element among the at least two optical elements, in response to said incident electromagnetic wave, said response being a function of a wavelength of said incident electromagnetic wave, wherein said means comprise at least one nanojet-based dielectric deflector compound of at least two dielectric materials having different refractive indexes, and wherein said optical elements are at a distance from said nanojet-based dielectric deflector.

The present disclosure thus relies on a novel and inventive approach of optical devices relying on the use of a compound material dielectric deflector for metasurface devices.

Actually, in most prior art cases, metasurface (MS) devices are based on subwavelength-size nanoparticles (NP) or nanoresonators assembled on or inside a dielectric substrate. The particles are assembled in regular one- or two-dimensional arrays with a period smaller than the wavelength of the incident light. The optical response of such nanoparticles of the transmit arrays (TA) and metasurfaces is wavelength-dependent. The optical response of prior art MS devices is tuned by varying the size, shape and orientation of individual nanoparticles. For any wavelength of an incident wave, an optical response of prior art MS devices is defined by a cumulative response of all NPs.

Such devices suffer from strong chromatic aberrations resulting from the intrinsic dispersive behavior of the resonators, thus compromising their performances. Even for resonators with small quality factors and corresponding broadband phase and amplitude responses, their operation still remains wavelength dependent.

According to an embodiment, a nanojet-microlens (NJ) based compound TA/MS design is proposed that allows to overcome the chromatic aberrations of the device while preserving the device's functionality for specific wavelengths. A device which is an achromatic and apochromatic optical device is disclosed. To this end, a compound optical device is disclosed which comprises at least two types of elements corresponding to at least two TA/MS, each TA/MS producing an optical response different from the other TA/MS with selection means enabling selective excitation for specific wavelengths, for instance for red, green and blue (RGB) colours of the elements which belong to these at least two TAs/MSs.

In other words, a unit cell of the optical device according to embodiments of the present disclosure comprises at least two optical elements, each optical element being characterized by a type of optical response to said incident electromagnetic wave.

Such optical elements may have a size smaller than the wavelength of an incident electromagnetic wave (for example smaller than $\lambda/2$). They may also be spaced by a distance smaller than the wavelength of an incident electromagnetic wave (for example smaller than $\lambda/2$). In this case, they are called subwavelength optical elements. However, the present disclosure is not limited to subwavelength optical elements. Thus, the optical elements used according to the present principle could be bigger than the wavelength of the incident electromagnetic wave.

The resulting optical response of the device shall be different for 2 different wavelengths.

According to an embodiment of the present disclosure, each optical element of the unit cell belongs to a different set of optical elements. A set of optical elements is characterized by a type of optical response to said incident electromagnetic wave. A type of optical response may correspond to a phase shift applied to said incident electromagnetic wave or an amplitude change of at least part of a spectrum of said incident electromagnetic wave. Other types of optical responses are also possible.

According to an embodiment, the selection means enabling selective excitation are configured to selectively excite all optical elements belonging to a given set. Therefore, all optical elements of a same set contribute to the optical response of the device to an incident electromagnetic wave.

According to an embodiment, optical elements of the unit cell can be the same, i.e. belonging to a same set, and the optical response of the device to an incident electromagnetic wave thus depends on the number of optical elements excited by the incident electromagnetic wave.

Moreover, the unit cell may comprise selection means for selectively exciting at least one optical element as a function of the wavelength of the incident electromagnetic wave.

For instance, an optical response can be obtained by exciting only one optical element of the unit cell and another different optical response can be obtained by exciting two optical elements of the unit cell.

According to an embodiment, the selection means thus enable at least two different optical responses of the optical device for different wavelengths of incoming light. For example, for the incoming electromagnetic wave corresponding to the red color, the optical elements of a first set may be excited and thus produce the optical response of the optical device focusing the red color in some point; for a blue color, the optical elements of a second set may be excited and thus produce a different optical response of the optical device which can focus the incident light into the same point.

For instance, in one embodiment, two different optical responses may include two different tilts of the incident wave, i.e. two different deviation angles with respect to incident angle of the incident wave.

The optical device according to embodiments of the present disclosure thus relies on achromatic/apochromatic TA/MS capable of providing at least two different optical functions for at least two different wavelengths of the incident wave. The light propagates through the optical device while the wavefront of the incident wave is reshaped (via local change of the amplitude and/or phase of the incident wave caused by its interaction with different optical elements which belong to the same set). As a result, the outgoing electromagnetic wave may change its propagation direction as compared to the incident electromagnetic wave direction and/or converge to a different focal points above TA/MS.

According to an embodiment of the present disclosure, the selection means enabling selective excitation of all optical elements belonging to a given set are light guiding elements (so-called NJ-based dielectric deflectors), and the optical elements of TA/MS are targeted to be placed in a focal plane of the light guiding elements.

A light guiding element ensures a focusing function, and is able to focus light corresponding to RGB colors on different sets of optical elements, thus switching between the sets at selected wavelengths. According to an embodiment of the present disclosure, the light-guiding element is an NJ-based dielectric deflector. The light-guiding element is microstructure comprising a combination of two or more different dielectric materials with different refractive indexes in such a way that all NJ beams, originating from different edges (associated with different blocks/layers) of the microstructure, recombine and contribute to the formation of the NJ beam in the near-zone deflected from the normal direction. The characteristics of the generated NJ beams are controlled by the parameters of the corresponding blocks, i.e. refractive index ratios between the blocks, dimensions of the blocks and angle of wave incidence.

As a complement to the NJ beam formation, NJ microlenses can also produce a quiet zone, which is a zone characterized by very low field intensity values, e.g. much lower than that of the incident wave. As a consequence, the optical elements of the unit cell which are reached by the NJ beam are excited, and provide their optical response, while the optical elements of the unit cell which are in the quiet zone are not excited, and do not contribute to the optical response of the optical device.

According to an embodiment of the present disclosure, said nanojet-based dielectric deflector compound of at least two dieletric materials having different refractive indexes comprises at least a first part of dielectric material having a first refractive index $n_2$, and a second part of dielectric material having a second refractive index $n_3$, wherein said first part and said second part are embedded in a homogeneous dielectric host medium having a refractive index $n_1$, and wherein $n_1 < n_3 < n_2$.

According to an embodiment of the present disclosure, the optical device is associated with a three-dimensional cartesian coordinate system defined by axis x, y and z with the z-axis being normal to said optical device, said first part and said second part of said nanojet-based dielectric deflector being positioned side by side along the x-axis, wherein the nanojet-based dielectric deflectors of said optical device are separated along the x-axis by a layer of said host medium.

According to an embodiment of the present disclosure according to a cross section with a plane xz:

said first part having a first width $W_1$ along the x-axis, said second part having a second width $W_2$ along the x-axis, wherein the width $W_1$ and $W_2$ equals to or is higher than half of the wavelength of said incident electromagnetic wave propagating through the nanojet-based dielectric deflector, said first part and said second part have a same height H along the z-axis, with $$H \approx \frac{W_1 + W_2}{\tan\theta_{B1} + \tan\theta_{B3}},$$

$\theta_{B1}$ being the radiation angle of a first nanojet beam generated by a first edge along the z-axis of said nanojet-based dielectric deflector, said first edge being between said first part and said host medium and $\theta_{B3}$ being the radiation angle of a second nanojet beam generated by a second edge along the z-axis of said nanojet-based dielectric deflector, said second edge being between said second part and said host medium.

The total size W of the nanojet-based dielectric deflector with $W = W_1 + W_2$ is preferably higher than the wavelength of the incident electromagnetic wave, while it may not exceed several wavelengths. With the widths and heights parameters cited above, the optimal spectral-dependent NJ beam deflection takes place if $H \approx H_B$, i.e. a focal point B for the NJs related to the external boundaries of the system is close to the surface of the NJ microlens or inside the NJ microlens. For such a focal point B, NJ deviation with different directions of deviated beam at different wavelengths is obtained. Thus, color splitting for specific wavelengths of the incident electromagnetic wave is achieved.

According to an embodiment of the present disclosure, the optical elements are placed at a distance from said nanojet-based dielectric deflector which is not higher than $H_C - H_B$, wherein $H_C$ and $H_B$ are the distances between the bottom of the nanojet-based dielectric deflector and intersection points of nanojet beams associated with edges of the first and second parts of the nanojet-based dielectric deflector with with $$H_B \approx \frac{W_1 + W_2}{\tan\theta_{B1} + \tan\theta_{B3}}, \text{ and } H_C \approx \frac{W_2}{\tan\theta_{B3} - \tan\theta_{B2}}$$

$\theta_{B2}$ being the radiation angle of a third nanojet beam generated by an edge along the z-axis of said nanojet-based dielectric deflector, said edge being between said first part and said second part of said nanojet-based dielectric deflector and $$\theta_{B2} \approx \frac{90° - \sin^{-1}\left(\frac{n_3}{n_2}\right)}{2}.$$

According to an embodiment of the present disclosure, a distance $W_3$ between two nanojet-based dielectric deflectors along said x-axis in said optical device is higher than or equals half of a wavelength corresponding to a wavelength for the blue color. For a fixed wavelength, the position of the hot spot and thus color separation is almost independent from the distance $W_3$ between the nanojet-based dielectric deflectors of the unit cell. However, for a small distance $W_3$, i.e. $W_3$ lower than half of the wavelength of the blue color, the power density redistribution could impact the color separation.

According to an embodiment of the present disclosure, the refractive index $n_3$ of the second part of said nanojet-based dielectric deflector is such that $n_3 > \sqrt{n_1 \times n_2}$. According to this embodiment, at some distance from the top surface of the device, the spot for blue color is situated above the second part with lower refractive index and the spots for green and red colors are above the first part with higher refractive index. Such an embodiment allows for a good blue color separation.

According to an embodiment of the present disclosure, said first part and said second part of said nanojet-based dielectric deflector have a shape of cuboids.

According to an embodiment said nanojet-based dielectric deflector has a shape of a half cylinder having an axis along the z-axis, with said second part being a half cylinder of radius $R_2$ surrounding said first part being a half cylinder of radius $R_1$.

According to an embodiment of the present disclosure, if said nanojet-based dielectric deflector has a shape of a half cylinder, said radius $R_1$ and $R_2$ of said first part and said second part are such that $R_2 - R_1 < R_1$ and $n_3 < \sqrt{n_1 \times n_2}$.

According to an embodiment of the present disclosure, all optical elements are located at a same distance along the z-axis from a top surface of said nanojet-based dielectric deflector.

According to an embodiment of the present disclosure, optical elements of a same set are located at a same distance along the z-axis from a top surface of said nanojet-based dielectric deflector and said sets of subwavelength optical elements are positioned at different distances along the z-axis from the top surface of said nanojet-based dielectric deflector.

According to an embodiment of the present disclosure, the heights along the z-axis of optical elements of a first set are different from the heights of optical elements of a second set.

According to an embodiment of the present disclosure, optical elements from different sets may differ in terms of material, and/or size, and/or or form.

According to an embodiment of the present disclosure, said optical elements belong to the group comprising:
- metallic particles;
- dielectric particles;
- semiconductor particles;
- optical resonators;
- optical antennas.

According to an embodiment of the present disclosure, said optical elements are assembled on or inside a dielectric substrate.

According to an embodiment of the present disclosure, said nanojet-based dielectric deflector is placed at a distance below a surface of said dielectric substrate on which said optical elements are assembled.

According to an embodiment of the present disclosure, said nanojet-based dielectric deflector is a nanojet microlens embedded in said host medium or placed on a dielectric substrate acting as a support layer.

According to an embodiment of the present disclosure, the optical device belongs to an eyewear optical device or to a display device.

Actually, compound metasurfaces, as proposed in this disclosure, may enable more sophisticated wavelength selective optical responses, as this is desirable for the next generation of eyewear optical devices.

4. BRIEF DESCRIPTION OF THE DRAWINGS

The present disclosure can be better understood with reference to the following description and drawings, given by way of example and not limiting the scope of protection, and in which:

FIG. 1 provides examples of metasurfaces devices according to the prior art;

FIG. 2(c) illustrates a far-field transmission measurement;

FIG. 5(a) illustrates an exemplary topology of an NJ-based dielectric color splitter with a normal incidence of the electromagnetic wave; FIGS. 5(b) and (c) illustrate cross-section views of a double-material dielectric microlens with $n_3 > \sqrt{n_1 \times n_2}$ and $n_3 < \sqrt{n_1 \times n_2}$ respectively; FIG. 5(d) illustrates an exemplary topology of an NJ-based dielectric color splitter with an oblique incidence of the electromagnetic wave having an angle $\theta_i$.

Figure 6A:
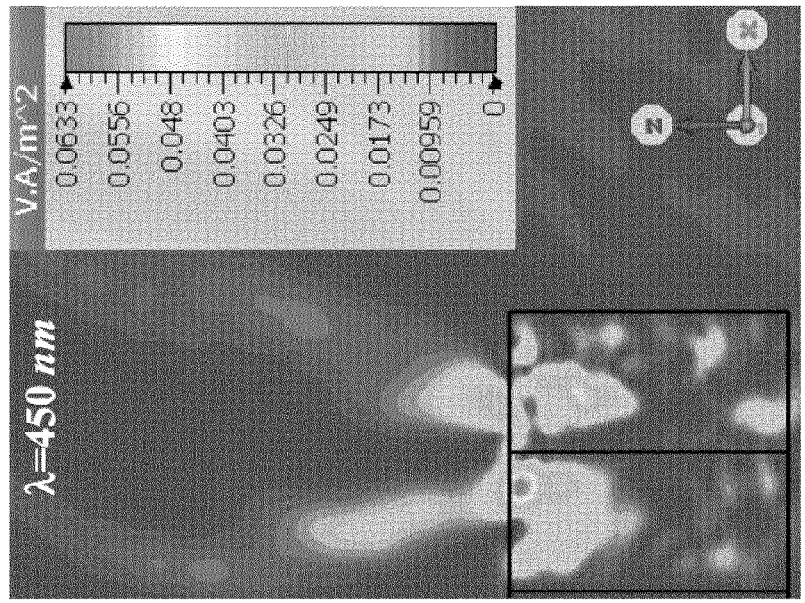
Figure 6A:
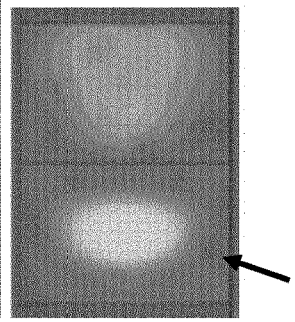
Figure 6A:
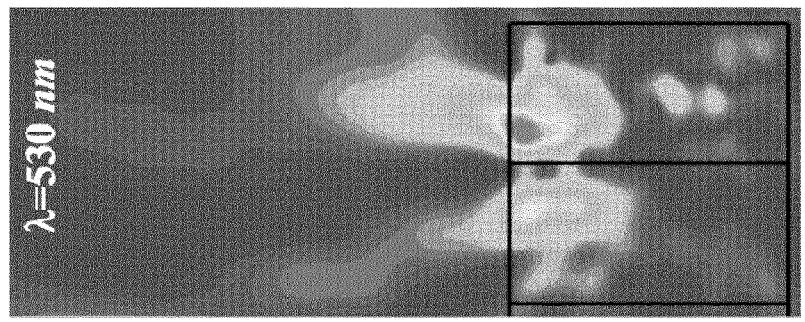
Figure 6A:
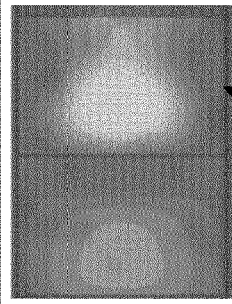
Figure 6A:
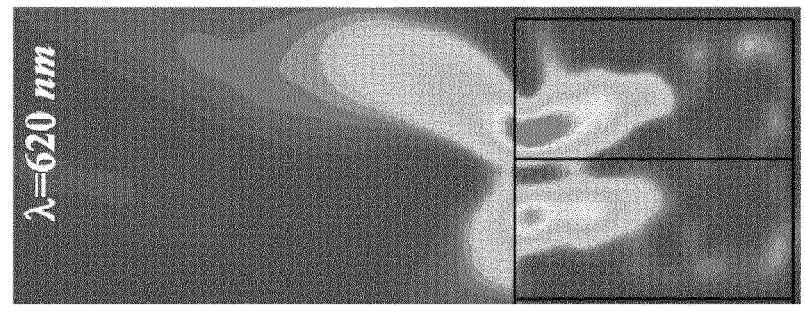
Figure 6A:
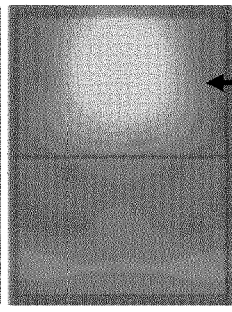
Figure 6B:
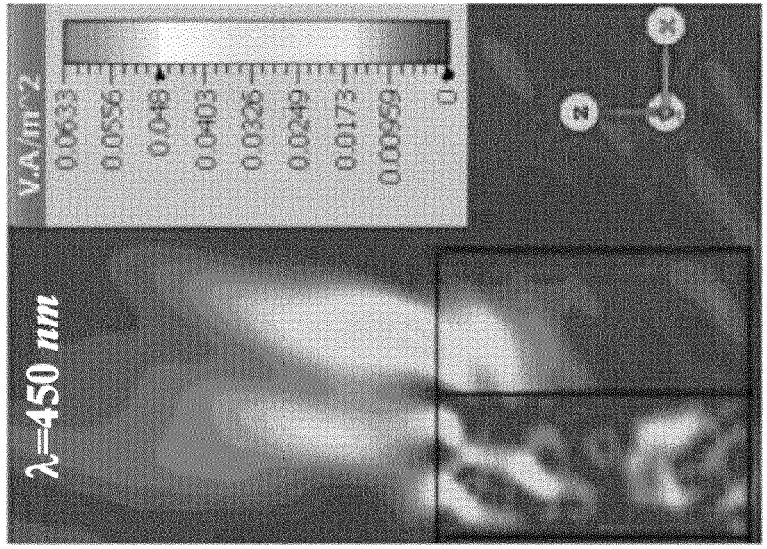
Figure 6B:
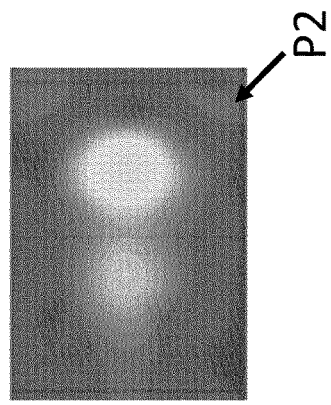
Figure 6B:
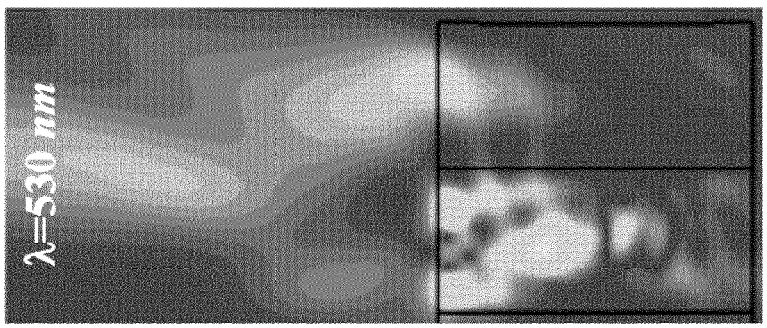
Figure 6B:
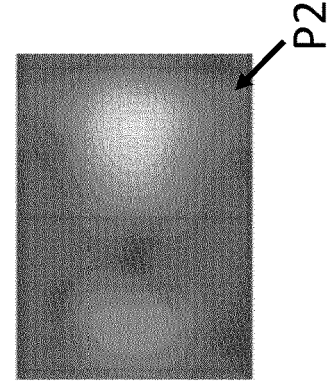
Figure 6B:
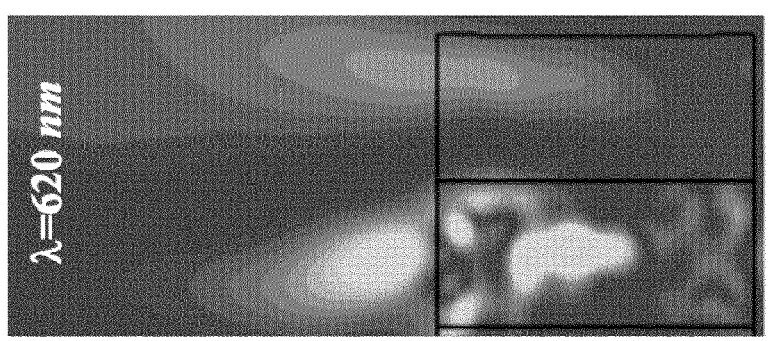
Figure 6B:
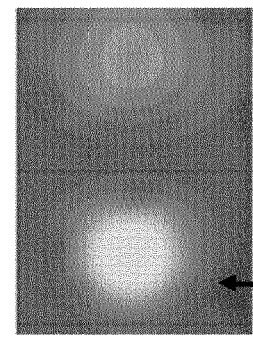
Figure 7:
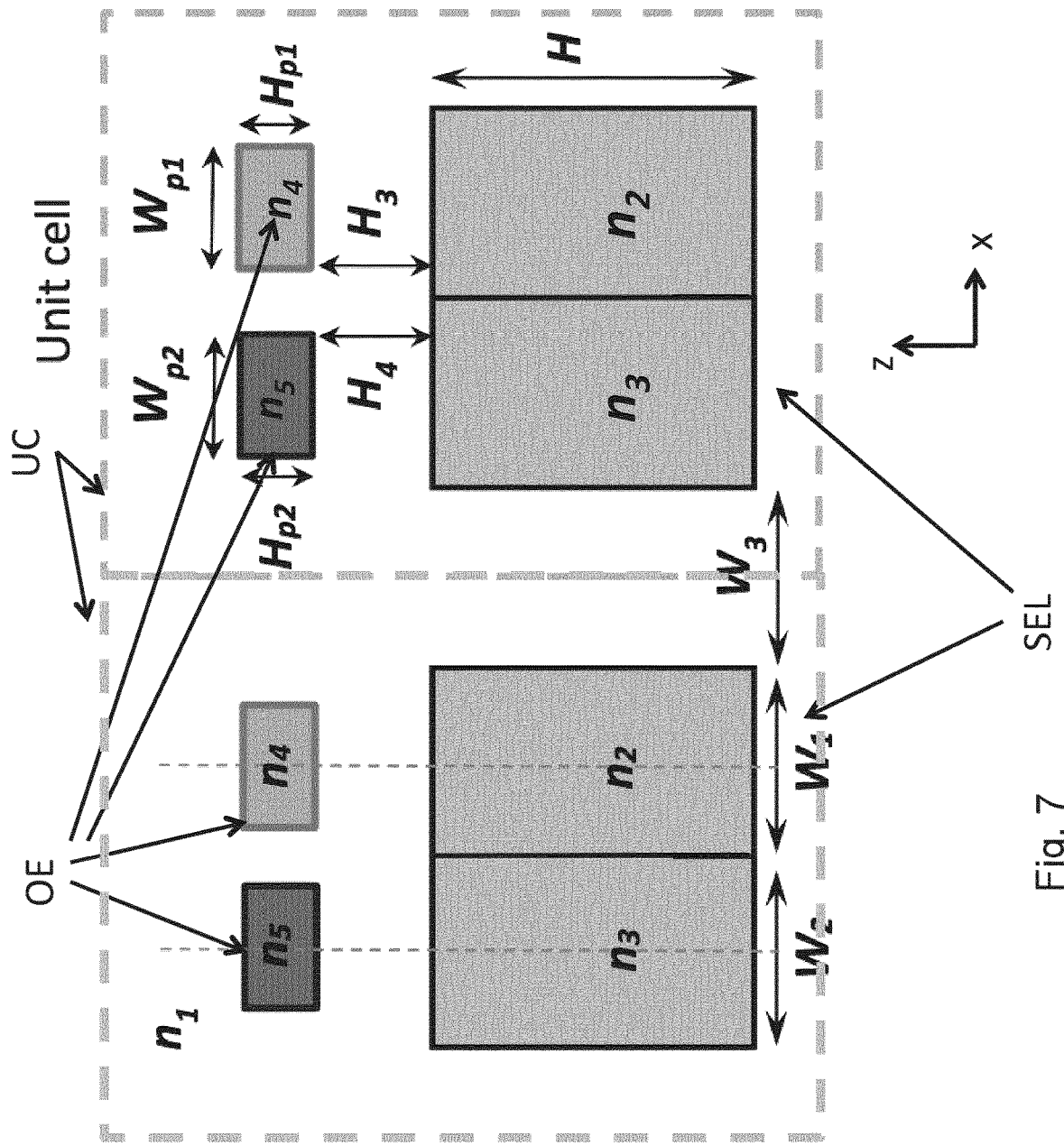
Figure 8:
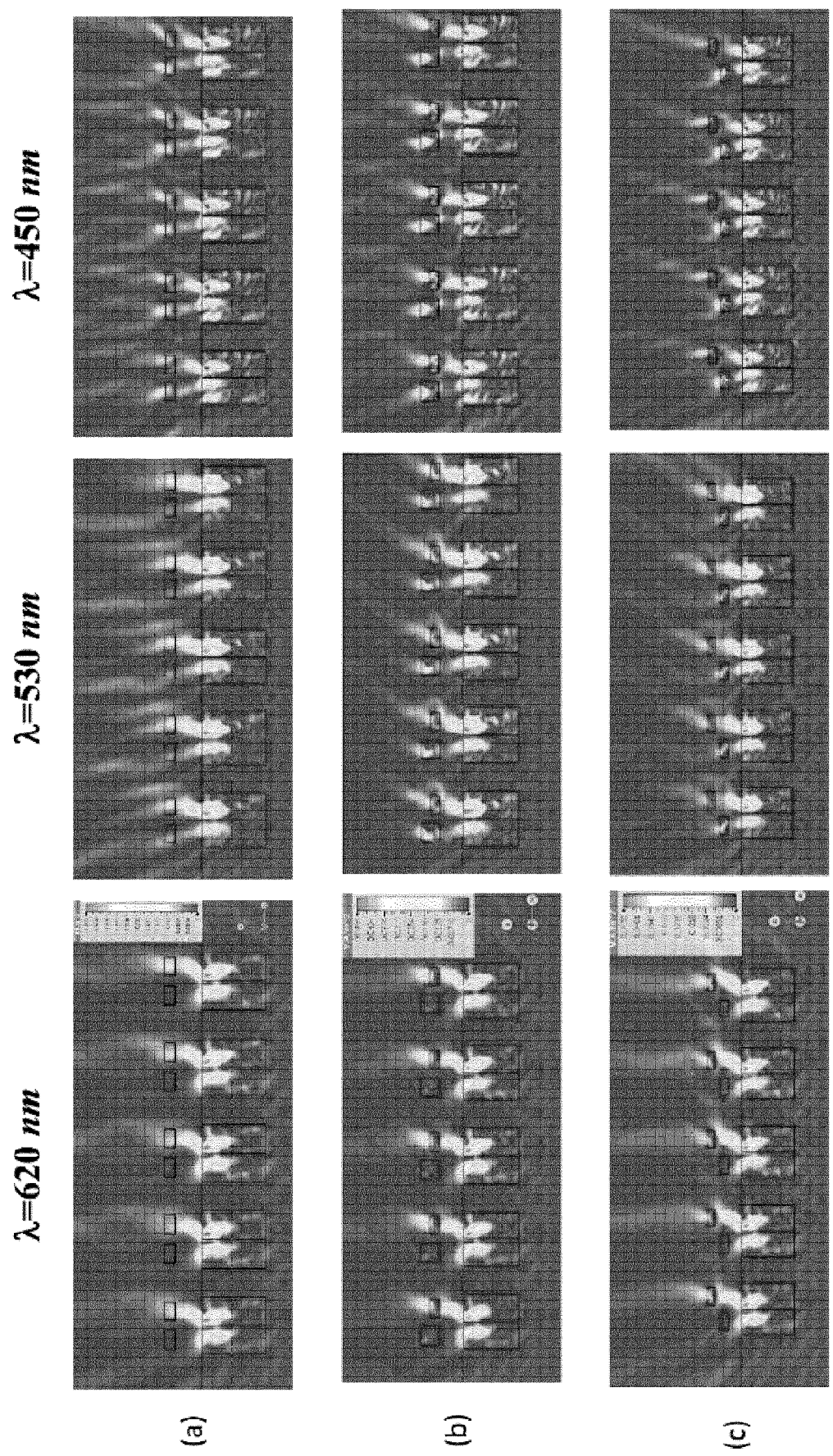
Figure 9:
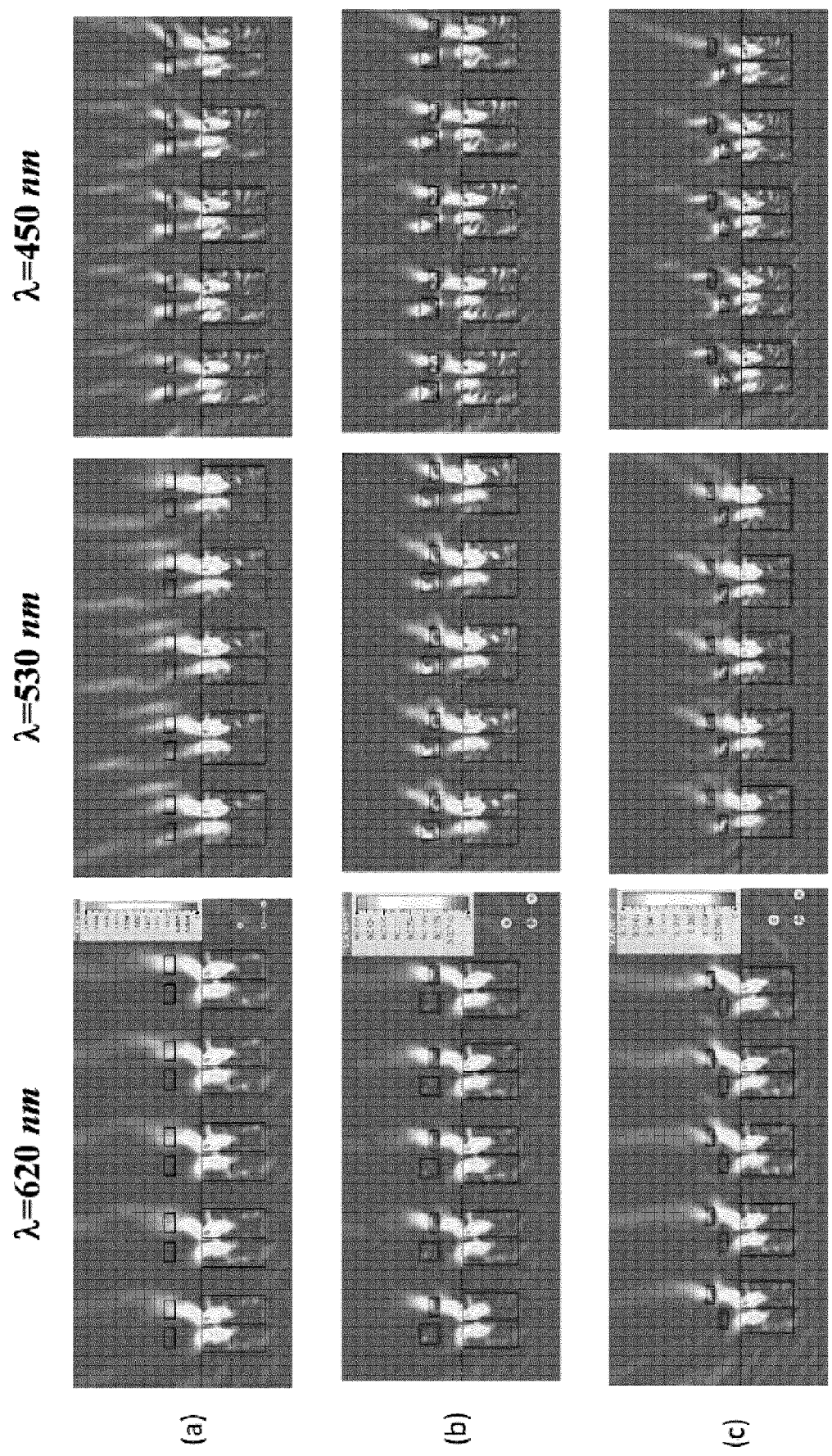
Figure 10:
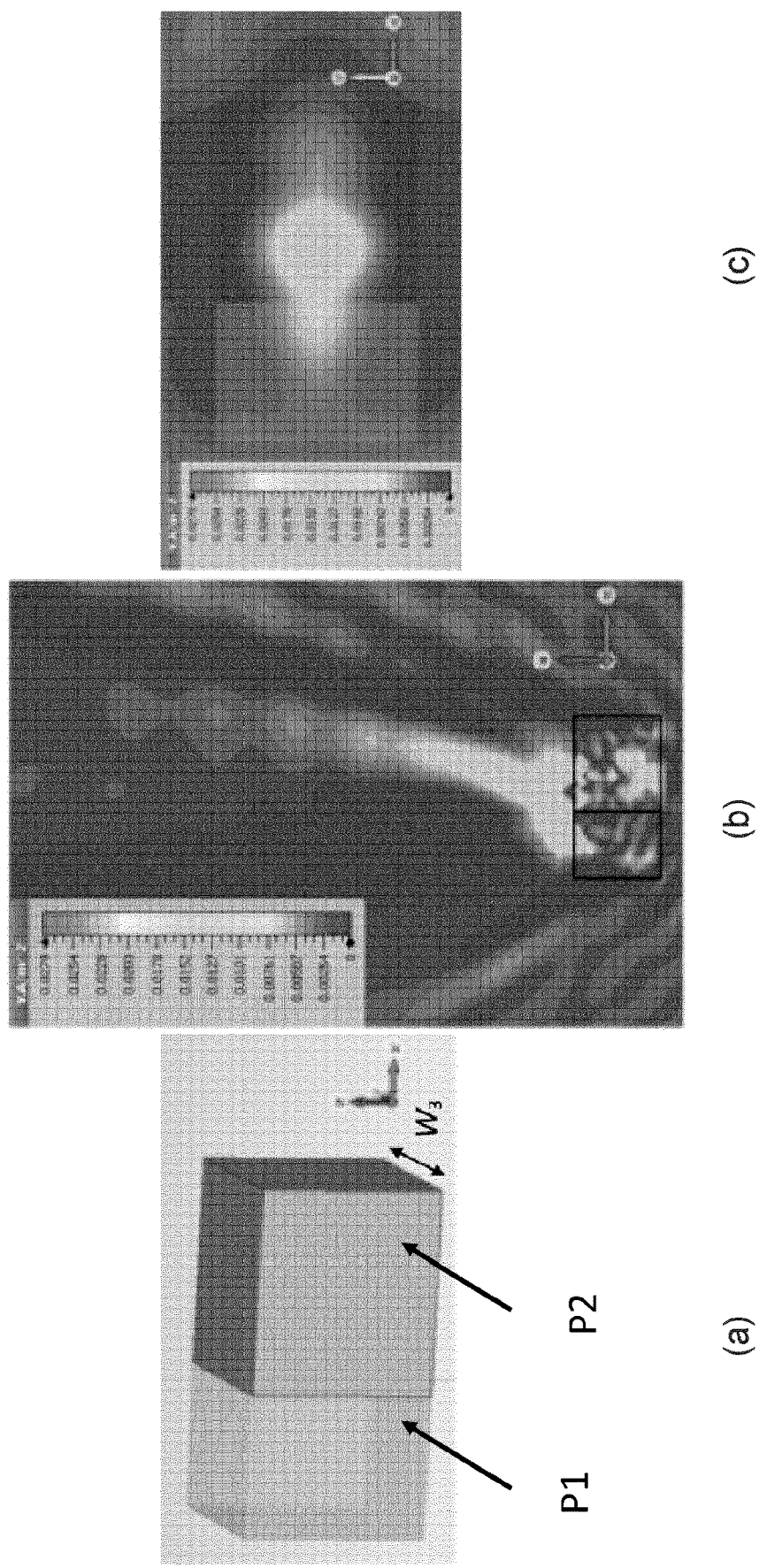
Figure 11:
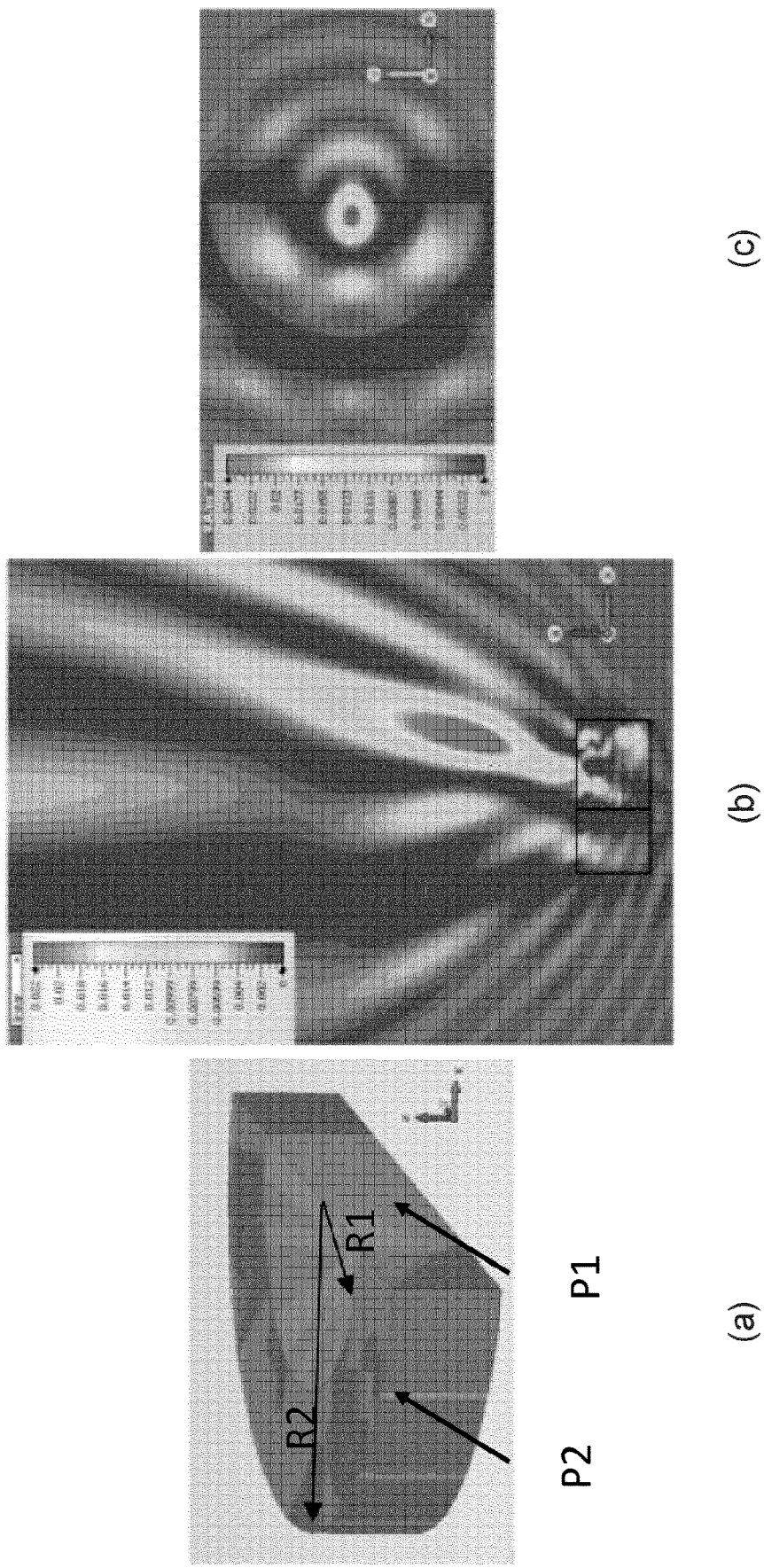

FIG. 6A illustrates power density distribution in (a) xz plane (Y=0) and (b) xy-plane (Z=1700 nm) for an exemplary optical device according to an embodiment of the present disclosure;

FIG. 6B illustrates power density distribution in (c) xz plane (Y=0) and (d) xy-plane (Z=1500 nm) for an exemplary optical device according to another embodiment of the present disclosure;

FIG. 7 illustrates a cross-section view of two unit cells of an exemplary optical device according to an embodiment of the present disclosure;

FIG. 8 illustrates power density distribution in the near zone for an exemplary optical device according to different embodiments (a, b, c) of the present disclosure;

FIG. 9 illustrates power density distribution in the near zone (xz plane, (Y=0) for a 1D periodic array (5 unit cells) for an exemplary optical device according to different other embodiments (a, b, c) of the present disclosure;

FIG. 10 illustrates an exemplary geometry (a) of a NJ-based microlens to be used in the optical device according to an embodiment of the present disclosure and its corresponding power density distribution in the xz-plane (b) and power density distribution in the xy-plane (c) for an exemplary optical device according to an embodiment of the present disclosure, FIG. 11 illustrates an exemplary geometry (a) of an NJ-based microlens to be used in the optical device according to an embodiment of the present disclosure and its corresponding power density distribution in the xz-plane (b) and power density distribution in the xy-plane (c) for an exemplary optical device according to an embodiment of the present disclosure.

The components in the figures are not necessarily to scale, emphasis instead being placed upon illustrating the principles of the invention. Throughout the description, the same reference numerals are used to designate the same elements.

5. DESCRIPTION OF EMBODIMENTS

A general principle of the present disclosure relies on a wavelength-selective metasurface device capable of providing at least two different optical functions for at least two different illumination conditions. According to an embodiment of the present disclosure, the optical device is adapted for color splitting, such as R, G, B separation.

Figure 1:
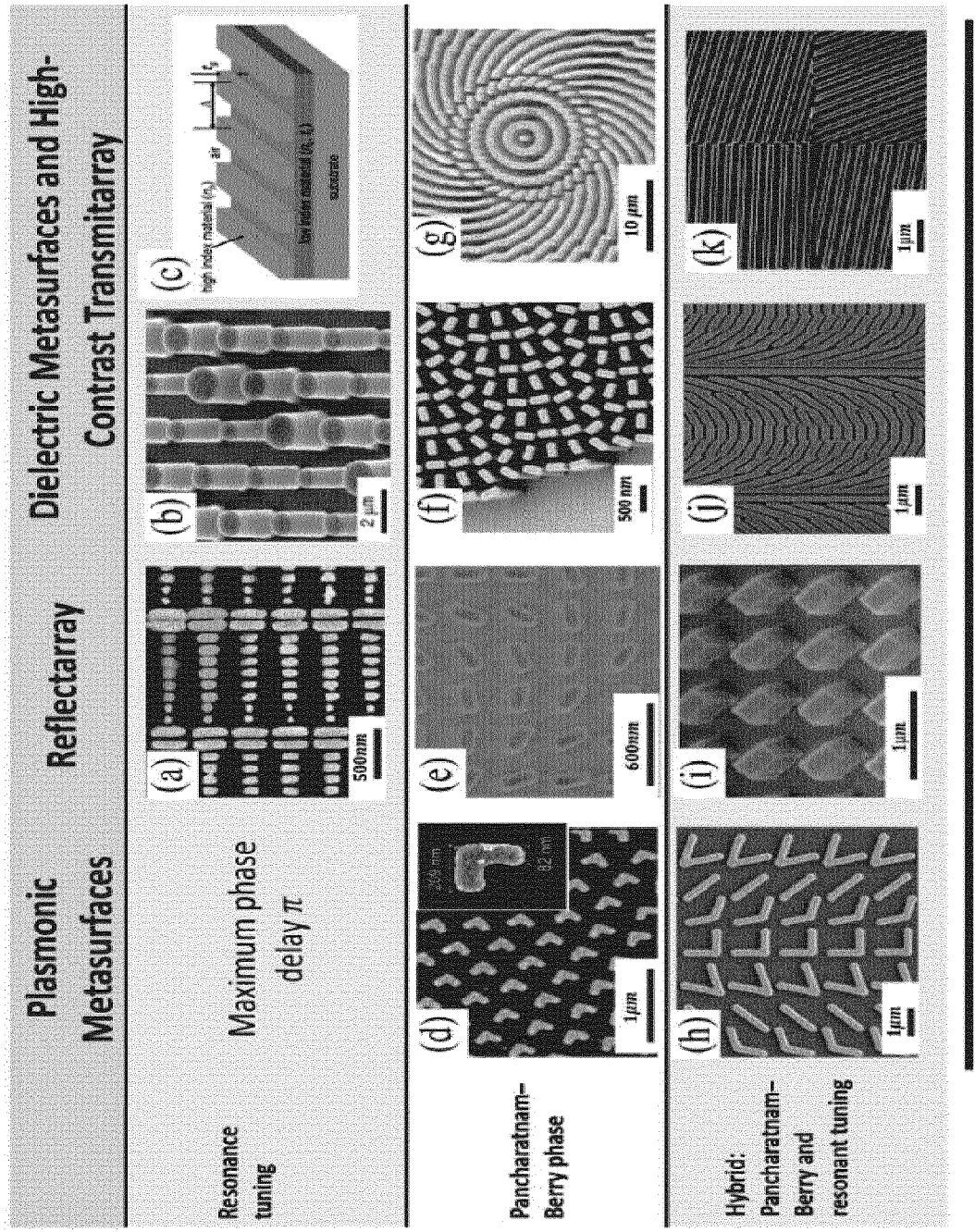
Figure 2:
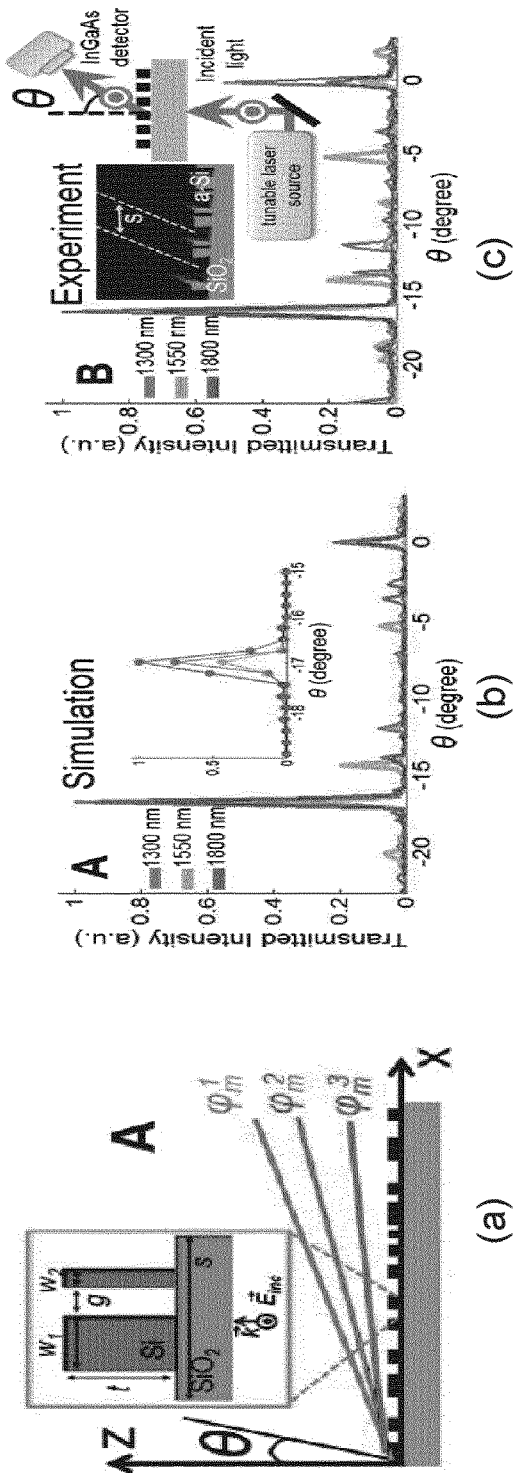
FIG. 2 illustrates a side view (a) of a metasurface according to the prior art, FIG. 2 (b) shows a simulated far field intensity representation.
Figure 3:
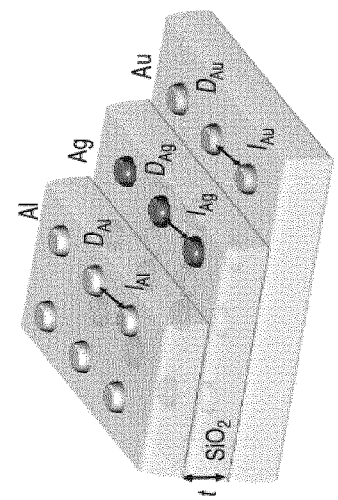
FIG. 3 (a) illustrates an artist view of a three-layer lens and FIG. 3 (b) shows a schematic illustration of a layered structure.
Figure 3:
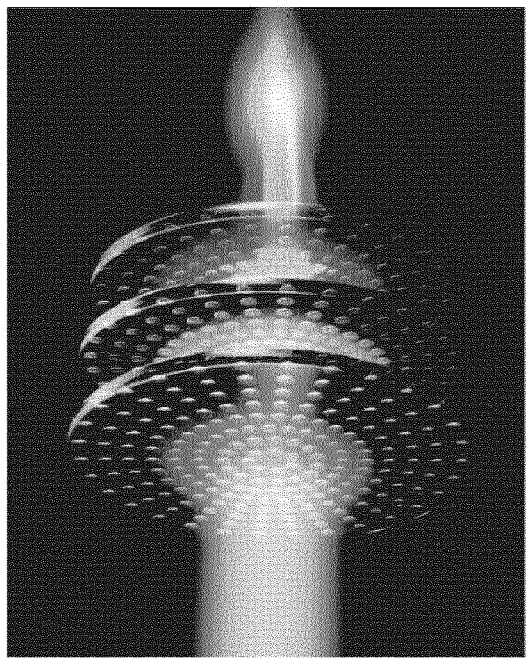

As an introduction to the description of embodiments of the present disclosure, FIG. 1 gives examples of different solutions proposed to address wavefront control with metasurface devices from the prior art. In the top panel of FIG. 1, from (a) to (c), the optical response of the nanostructures is tailored by changing the geometry of each individual resonator forming the metasurface. In the middle panel of FIG. 1, from (d) to (g), metasurfaces based on the Pancharatnam-Berry (PB) phase present very high scattering efficiencies, both in reflection and in transmission. The bottom panel of FIG. 1, from (h) to (k) shows hybrid metasurfaces, that work by using both resonant tuning and PB phase tuning.

In these examples, the subwavelength optical elements may consist in metallic strips having different shapes and orientations (see FIGS. 1 (a), (d) and (h)), or in subwavelength dielectric cylinders with a circular or rectangular cross-section having variable size and/or orientation (see FIGS. 1 (b), (e) to (g)), or take the form of strips creating a 1D array (see FIGS. 1 (c), (k)).

The basic units of transmitarrays (TA) and metasurfaces (MSs) are nanoresonators whose responses (amplitude and phase) are wavelength-dependent. The optical response of such optical devices is tuned by varying the size, shape, orientation and materials of individual nanoparticles. For any wavelength of an incident wave, an optical response of prior art optical devices is defined by a cumulative response of all nanoparticles. Such devices suffer from strong chromatic aberrations resulting from the intrinsic dispersive behavior of the resonators, thus compromising their performance. Even for resonators with small quality factors and corresponding broadband phase and amplitude responses, their operation still remains wavelength dependent.

Figure 4:
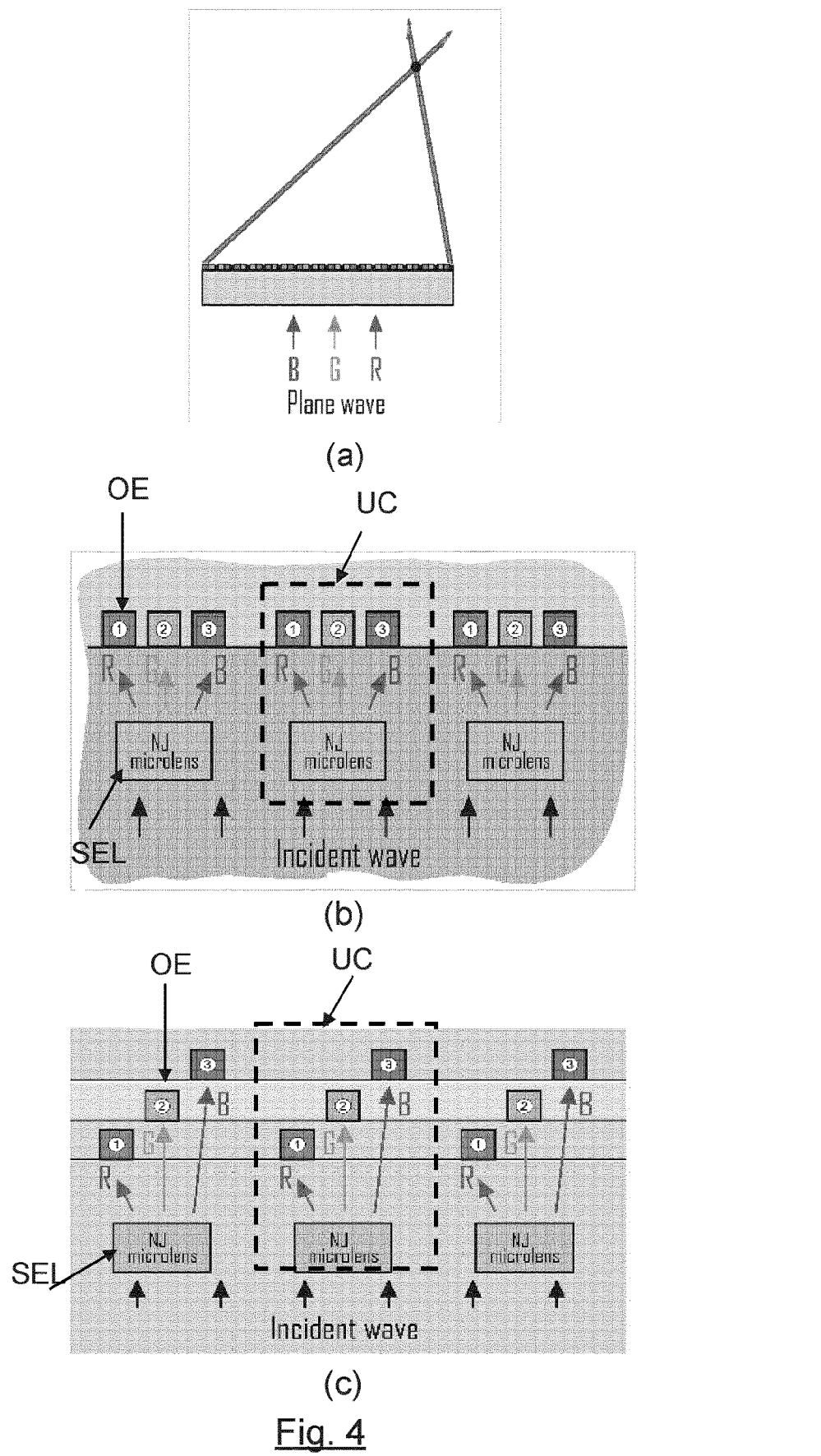
FIG. 4 (a) illustrates a schematic view of an exemplary apochromatic device according to an embodiment of the disclosure; Figures (b) and (c) are schematic drawings of an optical device according to embodiments of the present disclosure.

An example of optical device that overcomes this limitation and preserving its functionality for three wavelengths is thus proposed. Such an optical device is based on a NJ-microlens based compound TA/MS design as illustrated in FIG. 4 (a) showing schematically an apochromatic optical device which is designed to function as a lens that focuses three different wavelengths into the same point.

An optical device which is achromatic and apochromatic is proposed. To this end, a compound optical device is built which comprises at least two types of elements corresponding to at least two TA/MS (element 1, 2 or 3), each TA/MS producing an optical response different from the other TA/MS, with a selection means enabling selective excitation for red, green and blue (RGB) colors of the elements which belong to these at least two TAs/MSs.

A unit cell UC of the optical device according to embodiments of the present disclosure comprises at least two optical elements OE, which size and spacing are smaller than the wavelength of an incident electromagnetic wave. These optical elements belong to different sets of optical elements. All optical elements of a same set contribute to the optical response of the device to an incident wave corresponding to the red, green and blue (RGB) colors in the visible spectrum.

FIG. 4(a) is a schematic view of an exemplary apochromatic optical device. The optical device is designed to function as a lens that focuses three different wavelengths into the same point. FIGS. 4(b) and 4(c) illustrate schematic drawings of an optical device according to embodiments of the present disclosure. In the figures, each unit cell UC comprises three optical elements 1,2,3, where optical elements with a same number belong to a same set of optical elements.

Moreover, the unit cell UC comprises selection means SEL for selectively exciting the optical elements of a given set as a function of the wavelength of the incident electromagnetic wave. The selection means thus enable at least two different optical responses of the optical device for different wavelengths of incoming light. For example, for the incoming electromagnetic wave corresponding to the red color, it is the optical elements of a first set, indexed 1, which are excited and thus produce the optical response of the optical device focusing the red color in some point; for a blue color, it is the optical elements of a second set, indexed 3, which are excited and thus produce a different optical response of the optical device which can focus the incident light into the same point.

In FIG. 4(b), all optical elements of a unit cell are placed at a same distance from the selecting means SEL. In FIG. 4(c), the optical elements of a same set are placed at a same distance from the selecting means SEL, while each optical element of a unit cell is placed at a different distance from the selecting means SEL than the other optical elements of the unit cell.

A numerical analysis disclosed in the following reveals that diffraction of a plane wave on a microlens based on the combination of different dielectric materials, can result in the spectral-dependent NJ beam deviation. It is demonstrated that for some particular parameters, the NJ-based double-material microlens can split colors.

The operational principle of an exemplary NJ-based dielectric deflector is schematically shown in FIG. 5a. The position of focal spot, the angle of deviation, the intensity and the shape of an output NJ beam can be controlled by the variation of the refractive indexes and sizes of the constitutive parts/blocks of the NJ microlens SEL. FIG. 5(a) illustrates an exemplary topology of a NJ microlens SEL, which can also be called an NJ-based dielectric color splitter, with an electromagnetic wave having a normal incidence. The NJ-based dielectric color splitter comprises two parts: a first part (P1) of dielectric material with refractive index $n_2$ and a second part (P2) of dielectric material with refractive index $n_3$. In the example disclosed on FIG. 5(a), the NJ-based dielectric color splitter is placed in a dielectric host medium with refractive index $n_1$, and refractive indexes of the materials are such that $n_2 > n_3 > n_1$.

FIGS. 5(b) and 5(c) illustrate cross-section views of the double-material dielectric microlens presented in FIG. 5(a) with $n_3 > \sqrt{n_1 n_2}$ (FIG. 5(b)) and $n_3 < \sqrt{n_1 n_2}$ (FIG. 5(c)) respectively.

5.1. Topology

The general topology of the double-material microlens is illustrated in FIG. 5(b). This cross-section view may correspond to a combination of 2 different materials (each part may have a shape of cuboid as in FIG. 10(a), for example) with refractive indexes $n_2$ and $n_3$ ($n_2 > n_3$) embedded in a homogeneous dielectric host media with a refractive index $n_1 < n_3$. By changing the parameters of the microlens, the direction of deviation and intensity of generated NJ beam can be controlled. Hereafter, it is assumed that the materials and size of the constitutive parts can be optimized in order to manage the spectral-dependent NJ beam deflection. The effect of the size and refractive indexes of the constitutive blocks on the dispersion of the generated NJs is investigated in Section 5.2 below.

Hereafter, it is considered that the structures have vertical edges parallel to z-axis and top/bottom surfaces parallel to the xy-plane, which corresponds to the base angle $\alpha = 90°$.

However, according to an embodiment, some prismatic structures (with arbitrary base angles) can also be used. According to this embodiment, variation of the base angle value provides an additional degree of freedom in the control of the NJ beam radiation.

5.2. Design Principles & Main Performance Characteristics

In this Section, the selecting means of the optical device disclosed herein is further described. A set of equations is presented to estimate the optimal combinations of materials and dimensions of the blocks for spectral-dependent NJ beam deflection. It is demonstrated that the hot spot position and direction of beam deviation is sensitive to the sizes of constitutive parts. For the microlenses with some particular dimensions, the side of the NJ beam deflection will depend on the wavelength of incident wave.

5.2.1 Main Characteristics of Generated NJ Beams

The beam-forming phenomenon is associated with the edge of the system and the NJ beam radiation angle is defined by the Snell's low and can be determined using the approximate formula:

$$\Theta_{B1} \approx \frac{90° - \Theta_{TIR1}}{2}, \quad (1)$$

$$\text{where } \Theta_{TIR1} = \sin^{-1}\left(\frac{n_1}{n_2}\right)$$

is the critical angle of refraction, $n_1$ is the refractive index of host medium, and $n_2$ is the refractive index of microlens material.

The point of intersection of two equal NJ beams radiated from the opposite sides of the NJ microlens determines the focal length of the NJ microlens. In a first approximation, in the case of a single material element the focal length of the NJ microlens can be characterized as a function of the size (width) and index ratio of the media inside and outside the microlens. The total radiated NJ beam will be directed along the axis of the symmetry of the microlens.

Assume that $W_1$ is the width of the first element P1 (FIG. 5(b)). A second element P2 with the refractive index $n_3$ and width $W_2$ is attached to the first element P1 (FIG. 5(b)). Then, the angle of the NJ beam radiation from the boundary between P1 and P2 does not remain equal to $\Theta_{B1}$. The output NJ beam is refracted at the angle $\Theta_{B2}$ into the medium with higher refractive index. If $n_2 > n_3$ then the angle $\Theta_{B2}$ can be determined as $$\Theta_{B2} \approx \frac{90° - \Theta_{TIR2}}{2}, \quad (2)$$

$$\text{where } \Theta_{TIR2} = \sin^{-1}\left(\frac{n_3}{n_2}\right).$$

The NJ beam radiation angle at the third edge (between the second element P2 and the host medium) corresponds to $$\Theta_{B3} \approx \frac{90° - \Theta_{TIR3}}{2}. \quad (3)$$

$$\text{where } \Theta_{TIR3} = \sin^{-1}\left(\frac{n_1}{n_3}\right).$$

It shall be noted that the length, intensity and angle of deviations of the NJs NJ1, NJ2 and NJ3 are different. The maximal intensity and minimal length correspond to the NJ beam with highest ratio between the refractive indexes; i.e; the NJ beam refracted at the angle $\Theta_{B1}$(NJ1).

The points of intersection of the NJs associated with the edges of the NJ microlens and radiated at the angles $\Theta_{B1}$, $\Theta_{B2}$ and $\Theta_{B3}$ are determined as follows. The point A of first and second Nis' (NJ1 and NJ2) intersection has the coordinates ($W_A$, $H_A$), where $$W_A \approx \tan\Theta_{B2} \cdot H_A, \quad (4)$$

$$H_A \approx \frac{W_1}{\tan\Theta_{B1} + \tan\Theta_{B2}}.$$

First and third NJs (NJ1 and NJ3) intersect at a point B with the coordinates ($W_B$, $H_B$), where $$W_B \approx \tan\Theta_{B3} \cdot H_B - W_2, \quad (5)$$

$$H_B \approx \frac{W_1 + W_2}{\tan\Theta_{B1} + \tan\Theta_{B3}}.$$

NJ2 and NJ3 intersect only if $n_3 > \sqrt{n_1 \times n_2}$ (FIG. 5(b)). In this case the coordinates of the intersection point C is determined as $$W_C \approx \tan\Theta_{B3} \cdot H_C - W_2, \quad (6)$$

$$H_C \approx \frac{W_2}{\tan\Theta_{B3} - \tan\Theta_{B2}}.$$

For NJ microlenses with equal sizes of constitutive parts and total width $W \leq \lambda$ ($W = W_1 + W_2$, $W_1 = W_2$) the output NJ beam shifts towards the part with lower refractive index $n_3$. By varying the refractive index $n_3$, it is possible to tune the position of the hot spot of the total NJ outside the elements. The total response of the NJ microlens is almost independent on the wavelength of incident electromagnetic wave.

Figure 5:
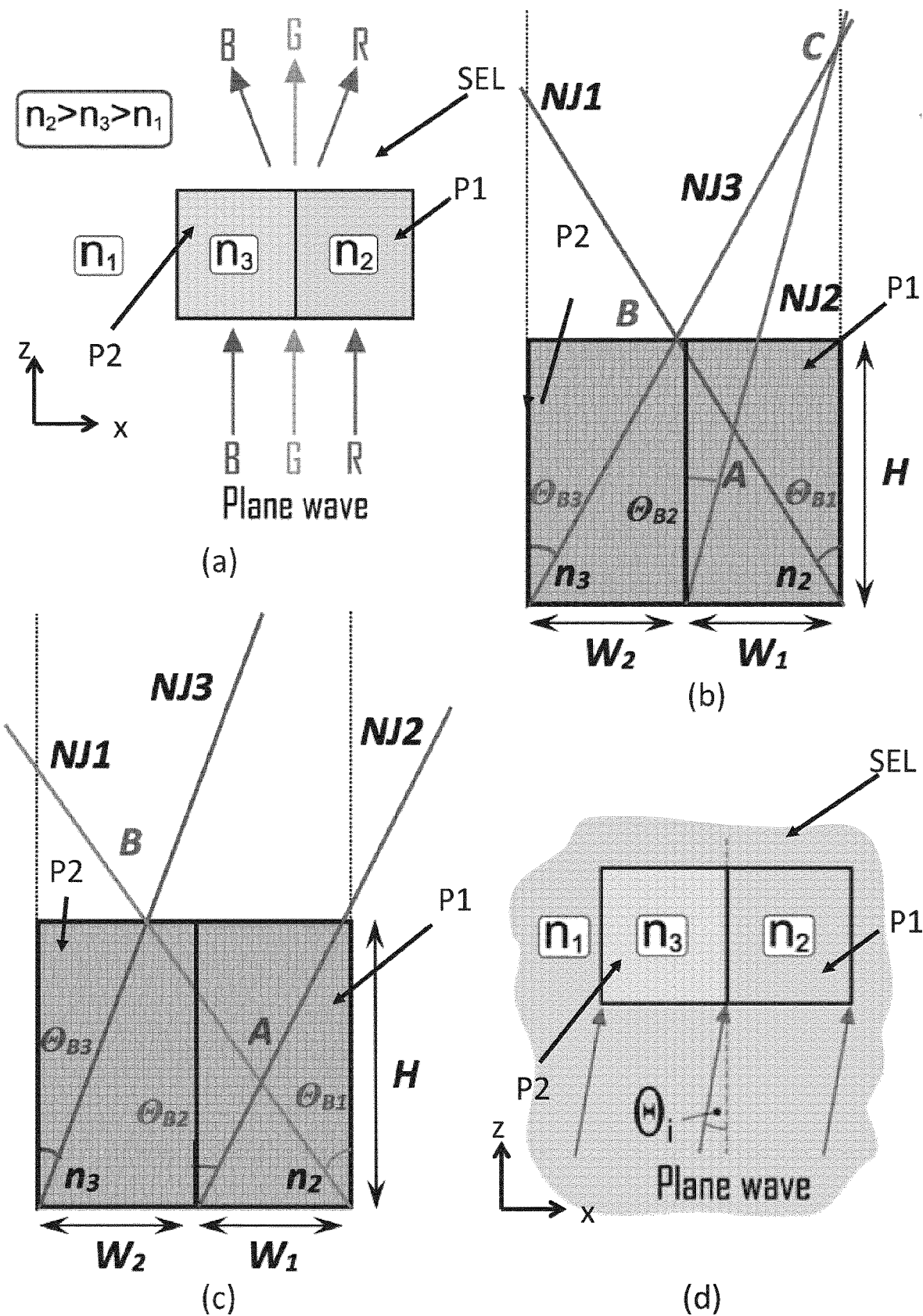

For the systems with equal sizes of constitutive parts and $W > \lambda$, two cases should be distinguished:

for $n_3 < \sqrt{n_1 n_2}$ (FIG. 5 (c)), the behaviour of the NJ beam is the same as in the previous case. Also, a similar behavior is observed for a double-material microlens with $n_3 > \sqrt{n_1 n_2}$ and $H < H_A$.

for $n_3 > \sqrt{n_1 n_2}$ and $H \geq H_A$ (FIG. 5(b)), there is a deviation of the NJ beam towards the part with higher refractive index $n_2$. The hot spot position of the generated NJ beam depends on the wavelength of incident wave.

The numerical simulations presented below demonstrate that maximal spectral-dependent NJ beam deflection for 3 different wavelengths ($\lambda_1 < \lambda_2 < \lambda_3$) is observed for microlenses with $W \cong \lambda_2$ and $H \cong H_B$, In this case, the side of NJ deviation depends on the wavelength of incident wave. Particularly, for $n_3 > \sqrt{n_1 n_2}$ (FIG. 5(b)) at $\lambda = \lambda_1$, a long intensive NJ beam deviated towards the part with lower refractive index $n_3$ is obtained. In this case, the main part of the total response of the microlens will be provided by the short but most intensive NJ beam associated with the right edge of the microlens (Nil in in FIG. 5(b)).

For the case of longer wavelengths ($\lambda = \lambda_{2,3}$), the maximal total response is determined by the NJ2 and NJ3 beams which are longer but less intensive. As a result, the long intensive NJ beams are deviated towards the part with higher refractive index $n_2$.

With $n_3 < \sqrt{n_1 n_2}$ (FIG. 5(c)), the opposite situation is observed. At $\lambda = \lambda_1$, the main part of the total response of the microlens is provided by the NJ beam NJ3. For the chosen parameters, the NJ beam NJ3 is less intensive than the NJ beams NJ1 and NJ2) and a resulting NJ beam is deviated towards the part with higher refractive index $n_2$. The most intensive NJ beam NJ1 determines the response of the microlens at $\lambda = \lambda_2$. For both discussed cases, the response of the system at $\lambda = \lambda_3$ is related to the input of the NJ beams of medium intensity.

The angle of plane wave incidence ($\Theta_i$, FIG. 5d) has also an influence on the characteristics of proposed double-material NJ microlens. This, it shall be taken into account that for an oblique incidence, the approximate formula for NJ beam radiation angles is modified and is presented in the form:

$$\Theta_{B1} \approx \left| -\frac{90° - \theta_{TIR1}}{2} + \frac{\Theta_i}{2} \right|, \quad (7)$$

$$\Theta_{B2} \approx \frac{90° - \theta_{TIR2}}{2} + \frac{\Theta_i}{2},$$

$$\Theta_{B3} \approx \frac{90° - \theta_{TIR3}}{2} + \frac{\Theta_i}{2}.$$

The height $H_B$=may then be obtained by substituting these angles into equation (5).

5.2.2 Parametric Study data for 3D double-material microlens computed using CST MICROWAVE STUDIO software is considered to illustrate the features of the generated NJ beam when the system is illuminated by TM (Transverse Magnetic) wave. The power density distribution is simulated for the different heights values of the NJ microlens.

FIG. 6A illustrates power density distribution in (a)—xz-plane (Y=0) and (b)—xy-plane (Z=1700 nm) for the systems of FIG. 5(b) where: $n_1$=1, $n_2$=1.8, $n_3$=1.6, $W_1$=$W_2$=600 nm, H=1200 nm, at 3 different wavelengths corresponding to the Red, Green and Blue wavelengths (620 nm, 530 nm and 450 nm respectively); FIG. 6B illustrates power density distribution in (c)—xz-plane (Y=0) and (d)—xy-plane (Z=1500 nm) for the systems of FIG. 5(c) with $n_1$=1, $n_2$=2, $n_3$=1.2, $W_1$=$W_2$=$W_3$=600 nm, H=1300 nm, at 3 different wavelengths corresponding to the Red Green and Blue wavelengths (620 nm, 530 nm and 450 nm respectively).

It appears that the spectral-dependent NJ beam deflection takes place if $H \cong H_B$ and that the focal point B for the NJ beams related to the external boundaries of the system (NJ1 and NJ3) is close to the surface of microlens or within the microlens (FIGS. 5(b) and (c)). As a result, for the system with $n_3 > \sqrt{n_1 n_2}$ (FIG. 5(b)) at some distance from the top surface of the element, the spot for a blue color ($\lambda$=450 nm) is situated above the part with lower refractive index, i.e. part P2, and the spots for green and red colors are above the part with higher refractive index, i.e. part P1 (FIG. 6A).

it shall be noted that for a double-material dielectric microlens with $n_3 > \sqrt{n_1 n_2}$, the spots corresponding to the green and red colors are quite close. By changing the materials of the layers, the positions of the spots can be controlled.

FIG. 6B shows the power density distribution in the xz- and xy-planes at wavelengths corresponding to the blue, green and red colors for a double-material dielectric microlens with $n_3 < \sqrt{n_1 n_2}$, ((FIG. 5(c)). This figure indicates the intensity distribution at same distance from the top of the double-material NJ microlens. The spots corresponding to green color (530 nm) are close to the spots for the blue color (450 nm). For instance, when the double-material dielectric microlens is used in sensors, detectors can be placed at different points at some distance from the top of the microlens, to detect the intensity of different wavelengths.

FIG. 7 illustrates cross-section views of two unit cells UC of the optical device according to an embodiment of the present disclosure.

It can be demonstrated that for a fixed wavelength, the position of the hot spot is almost independent from the distance $W_3$ between the double-material dielectric microlens (see FIG. 7).

At the same time, for a small distance $W_3$ ($W_3$<half of the blue color wavelength), it is possible to obtain a power density redistribution affecting color separation.

Increasing the angle of electromagnetic wave incidence (up to $\Theta_i = 30°$), it is still possible to obtain the desirable optical function. In this case, the distance between the intensive spots corresponding to the blue and red colors is small.

The power density distribution in the xz-plane at wavelengths corresponding to the blue, green and red colors may be considered to show the selective excitation of the particles by an array of NJ-based dielectric deflectors.

A system with two layers of nanoparticles is considered. The first layer (bottom layer of FIG. 7) is a 1D array of double-material (array of NJ-based dielectric deflectors, SEL). In the example illustrated on FIG. 7, the 1D array of NJ-based dielectric deflectors comprises successively the periodic array of NJ-based dielectric deflectors comprising a part of dielectric material with refractive index $n_3$ and a part of dielectric material with refractive index $n_2$.

The second layer (top layer of FIG. 7) is an array of uniform dielectric nanoparticles OE.

The full system with the two layers is immersed into the host surrounding medium with refractive index $n_1$.

For all presented simulations, it is assumed that in each set, the particles are the same. It is also assumed that each unit cell contains one NJ-based dielectric deflector (SEL) and two uniform nanoparticles (OE) in a form of 3D cuboids. Axis of the symmetry for each nanoparticle coincides with the axis of the symmetry of the constitutive part of the double-material element.

It is assumed that the elements of second layer can be elements of two different types with refractive indexes $n_4$ and $n_5$, heights $H_{pj}$ and widths $W_{pj}$ (here j=1,2 is the index of the set). These two types of elements can be situated at different distances $H_3$ and $H_4$ from the top of the double-material element. The width of each unit cell is then equal to $W_1 + W_2 + W_3$.

The system is illuminated by a unit-amplitude TM plane wave incident from below. Then, a symmetrical excitation of both nanoparticles in each unit cell in a case of single layer system can be observed at 3 wavelengths (620 nm, 530 nm, 450 nm) on FIG. 8a for a system with refractive index as follows $n_1 = n_2 = n_3 = 1.0$ which corresponds to having no selection means. A similar response of symmetrical excitation is observed on FIG. 8b for a system with refractive indexes $n_1 = 1.0$ and $n_2 = n_3 = 1.8$, which correspond to selection means composed of a single dielectric material. And nonsymmetrical and even selective excitation can be observed on FIG. 8c at 3 wavelengths (620 nm, 530 nm, 450 nm) in the case of a system with NJ-based dielectric deflectors according to an embodiment of the present disclosure, with refractive indexes $n_1 = 1.0$, $n_2 = 1.8$, $n_3 = 1.6$, which correspond to selection means composed of double-dielectric material FIG. 8 illustrates power density distribution in the near zone (xz-plane, Y=0) for a 1D periodic array of 5 unit cells as presented in FIG. 7, with the following parameters for the dielectric material of the first layer: $W_1 = W_2 = W_3 = 600$ nm, H=1200 nm, (a) $n_2 = n_3 = 1.0$, (b) $n_2 = n_3 = 1.8$, (c) $n_2 = 1.8$, $n_3 = 1.6$, and the following parameters for the optical elements of the second layer: $W_{p1} = W_{p2} = 200$ nm, $H_{p1} = H_{p2} = 200$ nm, $H_3 = H_4 = 500$ nm, $n_1 = 1$, $n_4 = n_5 = 2.0$.

Changing the parameters of the nanoparticles of the second layer can affect the phase and amplitude of incident wave.

FIG. 9 illustrates power density distribution in the near zone (xz-plane, Y=0) for the 1D periodic array comprising 5 unit cells as presented in FIG. 7 with the following parameters for the double-material dielectric microlens: $n_1 = 1$, $n_2 = 1.8$, $n_3 = 1.6$, $W_1 = W_2 = W_3 = 600$ nm, H=1200 nm.

FIG. 9 illustrates the power density distribution in the xz-plane at wavelengths corresponding to the blue, green and red colors for the different parameters of the dielectric nanoparticles of second layer (corresponding to the optical elements OE of FIG. 7). FIG. 9(a) illustrates the responses obtained for optical elements of the second layer with the following parameters: $W_{p1} = W_{p2} = 200$ nm, $H_{p1} = H_{p2} = 200$ nm, $H_3 = H_4 = 500$ nm, $n_4 = n_5 = 1.3$. It can be seen that using the double-material dielectric microlens array as the first layer, totally different responses for RGB colors even for a second layer comprising 2 similar sets of nanoparticles as illustrated on FIG. 8(c), and FIG. 9(a) are obtained.

FIG. 9(b) illustrates the responses obtained for optical elements of the second layer which have different size, and the following parameters $W_{p1} = W_{p2} = 200$ nm, $H_{p1} = 200$ nm, $H_{p2} = 400$ nm, $H_3 = H_4 = 500$ nm, $n_4 = n_5 = 2.0$. It can be seen that the response of the system is modified using the sets with different size of the particles.

FIG. 9(c) illustrates the responses obtained for optical elements of the second layer placed at different distances from the top of the double-material microlens, and with the following parameters: $W_{p1} = W_{p2} = 200$ nm, $H_{p1} = H_{p2} = 200$ nm, $H_3 = 600$ nm, $H_4 = 300$ nm, $n_4 = n_5 = 2.0$.

According to an embodiment, the provided optical device is a compound metasurfaces device that allows to provide an aberration corrected optical response as desired for the next generation of eyewear optical devices.

FIGS. 10 and 11 illustrate exemplary embodiments of geometry for the selection means for the optical device. In FIG. 10(a), the double-material color-splitter has a shape of a cuboid wherein each part of material has a shape of cuboid. Results for the cuboid double material color-splitter are provided for illustration in FIGS. 10(b) and 10(c). FIG. 10(b) illustrates power density distribution in the xz-plane and FIG. 10(c) illustrates power density distribution in the xy-plane at λ=550 nm for the double-material microlenses with: $n_1 = 1$, $n_2 = 1.8$, $n_3 = 1.6$, $W_1 = 1000$ nm, $W_2 = 700$ nm, $W_3 = 1000$ nm, H=900 nm.

In FIG. 11(a), the double-material color-splitter has a shape of a half cylinder wherein the first part (P1) has a half cylinder shape and the second part (P2) is a half cylinder surrounding the first part P1. Results for the half cylinder double material color-splitter are provided for illustration in FIGS. 11(b) and 11(c). FIG. 11(b) illustrates power density distribution in the xz-plane and FIG. 11(c) illustrates power density distribution in the xy-plane at λ=550 nm for the double-material microlenses with: $n_1=1$, $n_2=1.8$, $n_3=1.3$, $R_1=500$ nm, $R_2=850$ nm, H=900 nm.

The color-splitters can be embedded in a host medium or placed on a dielectric substrate acting as a support layer. In the last case (FIG. 10(b)), a proper combination of the parameters of the system ($R_2-R_1 < R_1$ and $n_3 < \sqrt{n_1 n_2}$) provides an additional intensification of generated NJ beam and prevents splitting of the beam.

Two exemplary embodiments for a unit cell of TA/MS are illustrated in FIGS. 4(b) and (c). In the simplest case, a unit cell comprises only two optical elements of the second layer belonging to two sets of optical elements. Due to the nonsymmetrical and selective excitation of the elements of second layer at wavelengths corresponding to RGB colors, it is possible to get different optical responses of the optical device even in the case of two similar sets of elements. The optical element arrays of the second layer can be one-dimensional (1D) or two-dimensional (2D), thus having periodicity in one or two planes.

According to an embodiment, the optical elements belonging to the same sets are not identical in order to ensure a predefined functionality of the optical device, such as on- or off-axis focusing, for example.

The proposed microlenses can be fabricated using established nano-fabrication methods, such as UV/DUV/E-beam lithography.

The invention claimed is:

1. An optical device for forming an outgoing electromagnetic wave from an incident electromagnetic wave, wherein the optical device comprises at least one unit cell, the unit cell comprising:
    at least two optical elements; and
    a nanojet-based dielectric deflector configured to enable selective excitation of at least one optical element among the at least two optical elements, in response to the incident electromagnetic wave, the excitation being a function of a wavelength of the incident electromagnetic wave,
    wherein the nanojet-based dielectric deflector comprises at least one nanojet-based dielectric deflector compound of at least two dielectric materials comprising at least a first part of dielectric material having a first refractive index $n_2$ and a second part of dielectric material having a second refractive index $n_3$,
    wherein the first part and the second part are embedded in a dielectric host medium having a third refractive index $n_1$,
    wherein $n_1 < n_3 < n_2$, and
    wherein the optical elements are placed at a distance from the nanojet-based dielectric deflector.

2. The optical device of claim 1,
    wherein the optical device is associated with a three-dimensional cartesian coordinate system defined by axis x, y and z with the z-axis being normal to the optical device, the first part and the second part of the nanojet-based dielectric deflector being positioned side by side along the x-axis, and
    wherein nanojet-based dielectric deflectors of the optical device are separated along the x-axis by a layer of the dielectric host medium.

3. The optical device of claim 2, wherein according to a cross section with a plane xz:
    the first part having a first width $W_1$ along the x-axis,
    the second part having a second width $W_2$ along the x-axis,
    wherein the width $W_1$ and $W_2$ respectively equals to or is higher than half of the wavelength of the incident electromagnetic wave propagating respectively in the first part and in the second part,
    the first part and the second part have a same height H along the z-axis, with $$H \approx \frac{W_1 + W_2}{\tan\theta_{B1} + \tan\theta_{B3}},$$

$\theta_{B1}$ being the radiation angle of a first nanojet beam generated by a first edge along the z-axis of the nanojet-based dielectric deflector given by $$\theta_{B1} \approx \frac{90° - \sin^{-1}\left(\frac{n_1}{n_2}\right)}{2},$$

the first edge being between the first part and the host medium and $\theta_{B3}$ being the radiation angle of a second nanojet beam generated by a second edge along the z-axis of the nanojet-based dielectric deflector given by $$\theta_{B3} \approx \frac{90° - \sin^{-1}\left(\frac{n_1}{n_3}\right)}{2},$$

the second edge being between the second part and the host medium.

4. The optical device of claim 3,
    wherein the distance is lower than or equals to $H_C$-$H_B$, and
    wherein $H_C$ and $H_B$ are distances between a bottom of the nanojet-based dielectric deflector and intersection points of nanojet beams associated with edges of the first and second parts of the nanojet-based dielectric deflector with $$H_B \approx \frac{W_1 + W_2}{\tan\theta_{B1} + \tan\theta_{B3}}, \text{ and } H_C \approx \frac{W_2}{\tan\theta_{B3} - \tan\theta_{B2}}$$

with $\theta_{B2}$ being the radiation angle of a third nanojet beam generated by an edge along the z-axis of the nanojet-based dielectric deflector, the edge being between the first part and the second part of the nanojet-based dielectric deflector and $$\theta_{B2} \approx \frac{90° - \sin^{-1}\left(\frac{n_3}{n_2}\right)}{2}.$$

5. The optical device of claim 2, wherein a distance $W_3$ between two nanojet-based dielectric deflectors along the x-axis in the optical device is higher than or equals half of a wavelength corresponding to a wavelength for the blue color.

6. The optical device of claim 2, wherein the refractive index $n_3$ of the second part of the nanojet-based dielectric deflector is such that $n_3 > \sqrt{n_1 \times n_2}$.

7. The optical device of claim 2,
wherein the first part and the second part of the nanojet-based dielectric deflector have a shape of cuboids, or
wherein the nanojet-based dielectric deflector has a shape of a half cylinder having an axis along the z-axis, with the second part being a half cylinder of radius $R_2$ surrounding the first part being a half cylinder of radius $R_1$.

8. The optical device of claim 7, wherein if the nanojet-based dielectric deflector has a shape of a half cylinder, the radius $R_1$ and $R_2$ of the first part and the second part are such that $R_2 - R_1 < R_1$ and $n_3 < \sqrt{n_1 \times n_2}$.

9. The optical device of claim 2, wherein all optical elements are located at a same distance along the z-axis from a top surface of the nanojet-based dielectric deflector.

10. The optical device of claim 2,
wherein each optical element of the unit cell belong to a different set of optical elements, a set of optical elements being characterized by a type of optical response to the incident electromagnetic wave, and
wherein the nanojet-based dielectric deflector is configured to selectively excite all optical elements belonging to a given set.

11. The optical device of claim 10,
wherein optical elements of a same set are located at a same distance along the z-axis from a top surface of the nanojet-based dielectric deflector, and
wherein the sets of optical elements are positioned at different distances along the z-axis from the top surface of the nanojet-based dielectric deflector.

12. The optical device of claim 10, wherein heights along the z-axis of optical elements of a first set are different from heights of optical elements of a second set.

13. The optical device of claim 1, wherein the optical elements belong to a group comprising:
metallic particles;
dielectric particles;
semiconductor particles;
optical resonators; and
optical antennas.

14. The optical device of claim 1, wherein the optical elements are assembled on or inside a dielectric substrate.

15. The optical device of claim 14, wherein the nanojet-based dielectric deflector is placed at a distance below a surface of the dielectric substrate on which the optical elements are assembled.

16. The optical device of claim 1, wherein the nanojet-based dielectric deflector is a nanojet microlens embedded in the dielectric host medium or placed on a dielectric substrate acting as a support layer.

17. The optical device of claim 1, wherein the optical device belongs to an eyewear optical device or to a display device.

* * * * *